United States Patent
Ishihara et al.

(10) Patent No.: US 11,817,708 B2
(45) Date of Patent: Nov. 14, 2023

(54) POWER CONVERSION SYSTEM AND MANAGEMENT APPARATUS FOR THE SAME, AND DISTRIBUTED POWER SUPPLY APPARATUS

(71) Applicant: Mitsubishi Electric Corporation, Tokyo (JP)

(72) Inventors: Hiroki Ishihara, Tokyo (JP); Miwako Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 437 days.

(21) Appl. No.: 17/282,776

(22) PCT Filed: Dec. 10, 2018

(86) PCT No.: PCT/JP2018/045207
§ 371 (c)(1),
(2) Date: Apr. 5, 2021

(87) PCT Pub. No.: WO2020/121362
PCT Pub. Date: Jun. 18, 2020

(65) Prior Publication Data
US 2021/0391721 A1    Dec. 16, 2021

(51) Int. Cl.
*H02J 3/16* (2006.01)
*H02J 3/38* (2006.01)
(Continued)

(52) U.S. Cl.
CPC .............. *H02J 3/16* (2013.01); *G05F 1/70* (2013.01); *G06N 3/08* (2013.01); *H02J 3/381* (2013.01)

(58) Field of Classification Search
CPC .......... H02J 3/16; H02J 3/381; H02J 2203/20; G05F 1/70; G06N 3/08; Y02E 40/30; Y02E 60/00; Y04S 40/20
See application file for complete search history.

(56) References Cited

U.S. PATENT DOCUMENTS 9,159,981 B2 * 10/2015 Chan .................. H01M 50/553
10,027,119 B2 * 7/2018 Wells .................. G06Q 50/06
(Continued)

FOREIGN PATENT DOCUMENTS

JP    2006-81285 A    3/2006
JP    2012-50170 A    3/2012
(Continued)

OTHER PUBLICATIONS

International Search Report and Written Opinion dated Feb. 5, 2019, received for PCT Application PCT/JP2018/045207, Filed on Dec. 10, 2018, 12 pages including English Translation.
(Continued)

*Primary Examiner* — Ramesh B Patel
(74) *Attorney, Agent, or Firm* — XSENSUS LLP

(57) ABSTRACT

A management apparatus periodically transmits information for setting a first voltage range and a second voltage range smaller than the first voltage range to a distribution power supply apparatus. The distribution power supply apparatus removes, from an interconnection point voltage at an interconnection point with the distribution system, a voltage fluctuation component with a cycle shorter than a cycle in which the information is transmitted from the management apparatus to thereby generate a voltage command value of the interconnection point, and performs reactive power control for eliminating a voltage deviation of the interconnection point voltage with respect to the voltage command value. In the reactive power control, the generation of the reactive power is started when an absolute value of the voltage deviation exceeds the first voltage range, and the reactive power is adjusted until the absolute value falls below the second voltage range.

13 Claims, 13 Drawing Sheets

(51) Int. Cl.
*G05F 1/70* (2006.01)
*G06N 3/08* (2023.01)

(56) References Cited

U.S. PATENT DOCUMENTS

| | | | | |
|---|---|---|---|---|
| 10,063,055 | B2* | 8/2018 | Matan | H02J 3/06 |
| 10,074,990 | B2* | 9/2018 | Baba | H02M 7/44 |
| 10,559,962 | B2* | 2/2020 | Huang | H02J 1/10 |
| 10,581,245 | B2* | 3/2020 | Kuroda | H02J 13/00034 |
| 10,644,506 | B2* | 5/2020 | Gu | H02J 3/06 |
| 10,778,028 | B2* | 9/2020 | Saito | H02J 3/32 |
| 10,950,773 | B1* | 3/2021 | Baretz | C09K 11/7774 |
| 11,211,799 | B2* | 12/2021 | Varma | H02J 3/381 |
| 11,579,680 | B2* | 2/2023 | Wei | G06N 20/00 |
| 2016/0118803 | A1* | 4/2016 | Takahashi | H02J 3/12 700/286 |
| 2016/0156226 | A1* | 6/2016 | Itaya | H02J 3/14 323/234 |
| 2017/0302171 | A1* | 10/2017 | Goto | H02M 3/156 |
| 2020/0274357 | A1* | 8/2020 | Inoue | H02J 3/16 |
| 2021/0028625 | A1* | 1/2021 | Inoue | H02M 7/48 |
| 2021/0212267 | A1* | 7/2021 | Ellingham, Jr. | A01G 7/045 |

FOREIGN PATENT DOCUMENTS

| | | |
|---|---|---|
| JP | 2012-70598 A | 4/2012 |
| JP | 5618294 B2 | 11/2014 |
| JP | 2015-211480 A | 11/2015 |
| JP | 2016-36252 A | 3/2016 |
| JP | 2016-82741 A | 5/2016 |
| WO | 2014/207848 A1 | 2/2017 |

OTHER PUBLICATIONS

Notice of Reasons for Refusal dated Jun. 18, 2019, received for JP Application 2019-521495, 9 pages including English Translation.

* cited by examiner

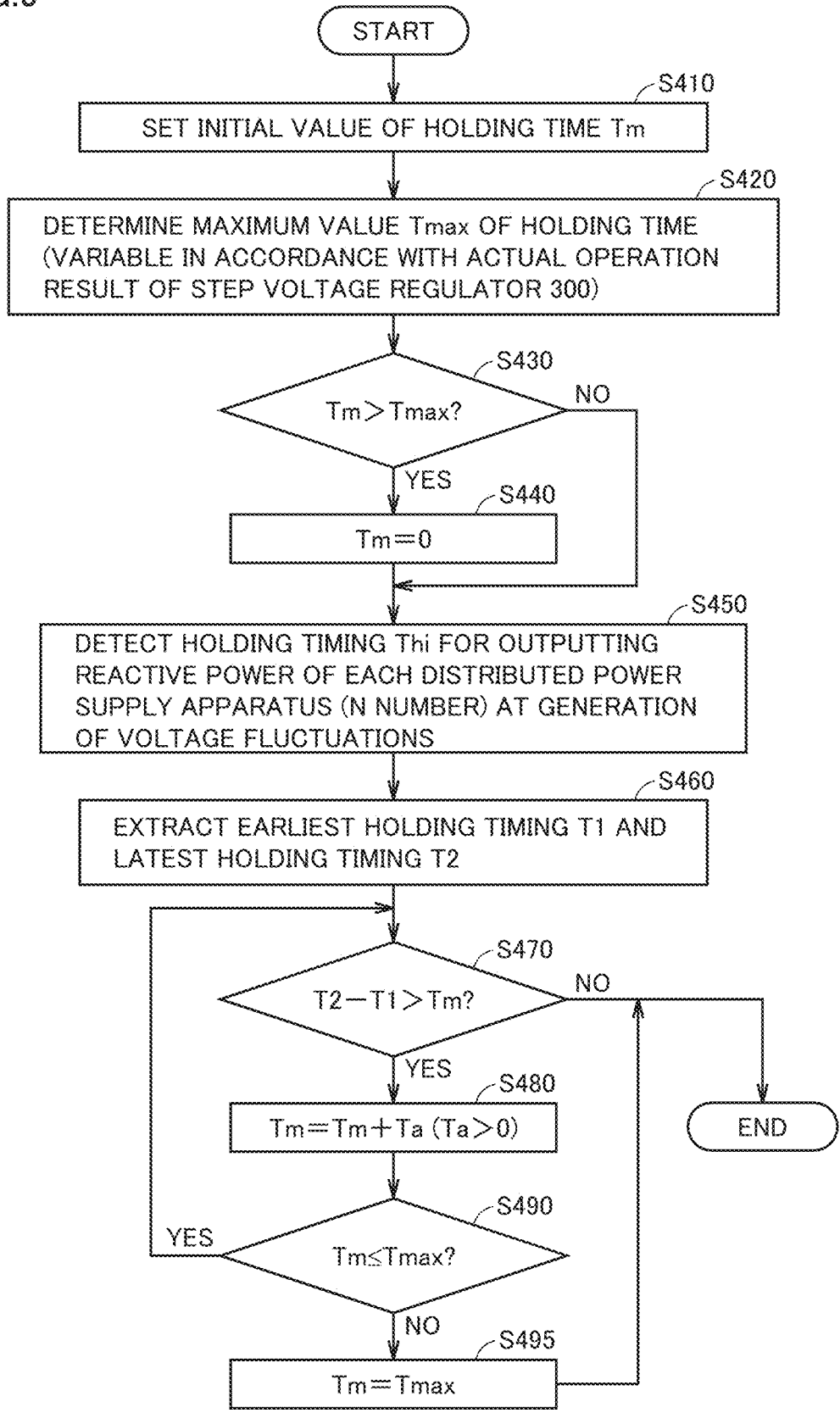

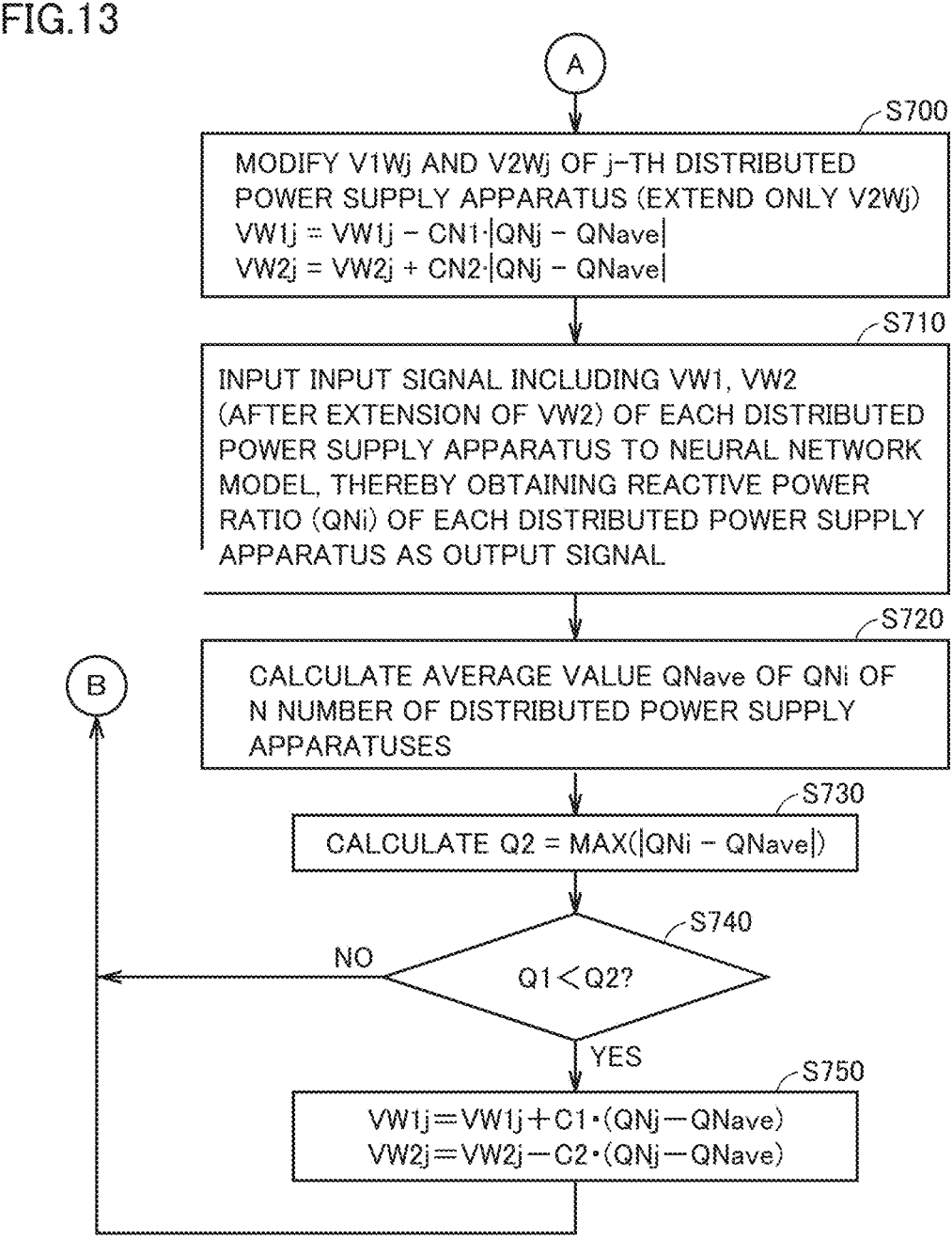

POWER CONVERSION SYSTEM AND MANAGEMENT APPARATUS FOR THE SAME, AND DISTRIBUTED POWER SUPPLY APPARATUS

CROSS-REFERENCE TO RELATED APPLICATION

The present application is based on PCT filing PCT/JP2018/045207, filed Dec. 10, 2018, the entire contents of which are incorporated herein by reference.

TECHNICAL FIELD

The present disclosure relates to a power conversion system and a management apparatus for the same, and a distributed power supply apparatus.

BACKGROUND ART

Along with the recent trend of expanded use of renewable energy, a distributed power supply, such as a photovoltaic unit and a storage battery, tends to be connected to a distribution system more frequently. This, however, may destabilize a system voltage due to a reverse power flow from the distributed power supply. For example, a power generation amount greatly varies depending on the amount of sunlight in photovoltaic power generation, leading to a fear that the degree of stability of the system voltage may decrease due to increasing or decreasing power that is reversed in flow in a short period of time.

The cost of maintaining the distribution system may increase by additionally providing a step voltage regulator (SVR), a static var compensator (SVC), or the like in order to improve voltage stabilization on the distribution system side. In a known technique, thus, reactive power that is output from a power conditioner to the distribution system is controlled on the distributed power supply side, thereby adjusting a system voltage. For example, power output from a conditioner of a photovoltaic system is standardized at a certain power factor (e.g., 0.95), but it is difficult to appropriately adjust a voltage in accordance with an ever-changing state of the distribution system.

Thus, Japanese Patent No. 5618294 (PTL 1) discloses control of instructing a reactive power adjustment requested amount to a power conditioner that controls an interconnection point voltage of each distributed power supply. According to PTL 1, a high-voltage distribution system monitoring apparatus transmits a reactive power adjustment requested amount to a low-voltage distribution system monitoring apparatus that controls a plurality of power conditioners, and the low-voltage distribution system monitoring apparatus can appropriately allocate the reactive power adjustment requested amount transmitted among the power conditioners under the control of the low-voltage distribution system monitoring apparatus, to thereby appropriately adjust a voltage of an entire distribution system.

CITATION LIST

Patent Literature

PTL 1: Japanese Patent No. 5618294

SUMMARY OF INVENTION

Technical Problem

According to PTL 1, the high-voltage distribution system monitoring apparatus needs to calculate a reactive power adjustment requested amount in real time in response to variations caused in system voltage and then transmit the calculated amount to the low-voltage distribution system monitoring apparatus and the power conditioners. This requires real-time, short-cycle information transmission, unlike a normal demand response or the like.

PTL 1 assumes the transmission of a reactive power adjustment requested amount by power line communications (PLC), but compromising emanations may be caused at high frequency due to the use of the power line communications.

Moreover, in order to set a reactive power adjustment requested amount to all of the distributed power supplies (power conditioners), the high-voltage distribution system monitoring apparatus and the low-voltage distribution system monitoring apparatus have to perform an operation for calculating the reactive power adjustment requested amount at high speed, leading to a fear of an increased cost associated with an increased load of a calculator.

The present disclosure has been made to solve the above problem. An object of the present disclosure is therefore to stabilize a system voltage through autonomous control on a distributed power supply apparatus side without increasing an operation load on a management apparatus side in a power conversion system including a distributed power supply apparatus interconnected to a distribution system and a management apparatus.

Solution to Problem

According to an aspect of the present disclosure, a power conversion system includes one or more distributed power supply apparatuses interconnected to a distribution system, and a management apparatus for the one or more distributed power supply apparatuses. The management apparatus periodically transmits, to the one or more distributed power supply apparatuses, information for setting a first voltage range used in control of the one or more distributed power supply apparatuses and a second voltage range smaller than the first voltage range. The distributed power supply apparatus includes a distributed power supply, a power conversion circuit, a control operation unit to control the power conversion circuit, and a voltage detector to detect a voltage of an interconnection point. The power conversion circuit controls power conversion between the interconnection point with the distribution system and the distributed power supply. The control operation unit removes, from an interconnection point voltage detected by the voltage detector, a voltage fluctuation component with a cycle shorter than a cycle in which the information is transmitted from the management apparatus, to thereby generate a voltage command value of the interconnection point, and performs reactive power control of causing the power conversion circuit to generate reactive power for eliminating a voltage deviation of the interconnection point voltage with respect to the voltage command value. In the reactive power control, the generation of the reactive power is started when an absolute value of the voltage deviation exceeds the first voltage range, and the reactive power is adjusted so as to decrease the absolute value of the voltage deviation until the absolute value of the voltage deviation falls below the second voltage range.

Another aspect of the present disclosure relates to a management apparatus for a power conversion system in which a distributed power supply apparatus is interconnected to a distribution system, and the management apparatus includes a communication unit. The communication unit periodically transmits, to the distributed power supply apparatus, information for setting a first voltage range used in control of the distributed power supply apparatus and a second voltage range smaller than the first voltage range. The distributed power supply apparatus removes, from an interconnection point voltage at the interconnection point with the distribution system, a voltage fluctuation component with a cycle shorter than a cycle in which the information is transmitted from the communication unit, to thereby generate a voltage command value of the interconnection point, and performs reactive power control of generating reactive power for eliminating a voltage deviation of the interconnection point voltage with respect to the voltage command value. In the reactive power control, the generation of the reactive power is started when an absolute value of the voltage deviation exceeds the first voltage range, and the reactive power is adjusted so as to decrease the absolute value of the voltage deviation until the absolute value of the voltage deviation falls below the second voltage range.

Still another aspect of the present disclosure relates to a distributed power supply apparatus interconnected to a distribution system, and the distributed power supply apparatus includes a distributed power supply, a power conversion circuit, a control operation unit to control the power conversion circuit, and a voltage detector to detect a voltage of an interconnection point. The power conversion circuit controls power conversion between the interconnection point with the distribution system and the distributed power supply. The distributed power supply apparatus periodically receives, from a management apparatus external to the distributed power supply apparatus, information for setting a first voltage range and a second voltage range smaller than the first voltage range. The control operation unit removes, from an interconnection point voltage detected by the voltage detector, a voltage fluctuation component with a cycle shorter than a cycle in which the information is transmitted, to thereby generate a voltage command value of the interconnection point, and performs reactive power control of causing the power conversion circuit to generate reactive power for eliminating a voltage deviation of the interconnection point voltage with respect to the voltage command value. In the reactive power control, the generation of the reactive power is started when an absolute value of the voltage deviation exceeds the first voltage range, and the reactive power is adjusted so as to decrease the absolute value of the voltage deviation until the absolute value of the voltage deviation falls below the second voltage range.

Advantageous Effects of Invention

With the present disclosure, the voltage fluctuation component with a cycle shorter than a cycle in which the information about the first and second voltage ranges is transmitted from the management apparatus can be removed through autonomous reactive power control on the distributed power supply side, thus stabilizing a system voltage without increasing an operation load on the management apparatus side.

BRIEF DESCRIPTION OF DRAWINGS

FIG. 9 is a flowchart illustrating a control process of setting a holding time in reactive power control of a distributed power supply apparatus in a power conversion system according to Embodiment 3.

FIG. 13 is a second flowchart illustrating a control process of setting a command value of a distributed power supply apparatus using the neural network model in the power conversion system according to Embodiment 4.

DESCRIPTION OF EMBODIMENTS

Figure 1:
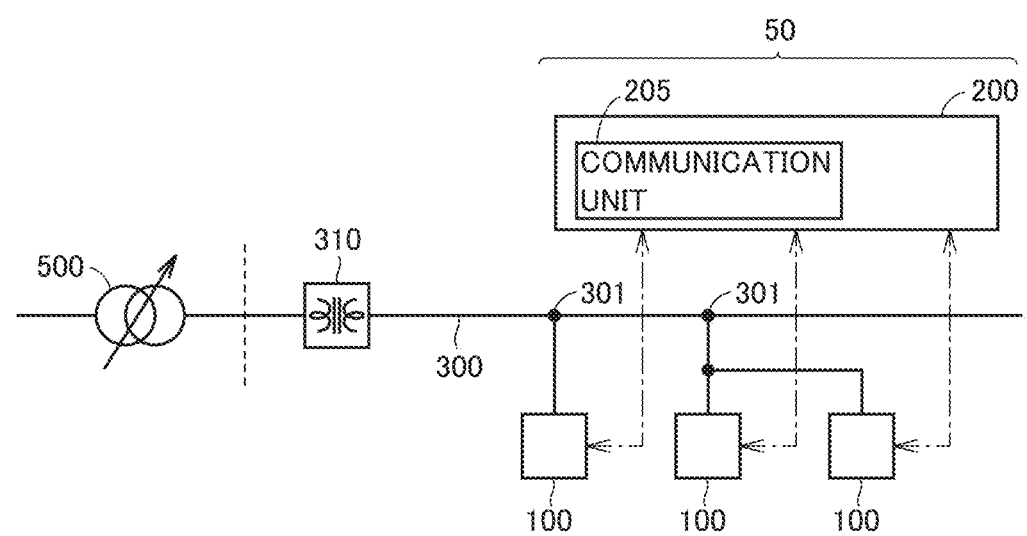
FIG. 1 is a schematic block diagram illustrating a distribution system to which a power conversion system according to the present embodiment is connected.

Embodiments of the present disclosure will now be described in detail with reference to the drawings. It is to be noted that in the description below, the same or corresponding portions in the figures are given the same reference characters and will not be described repeatedly in principle.

Embodiment 1

FIG. 1 is a schematic block diagram illustrating a distribution system to which a power conversion system according to the present embodiment is connected.

Referring to FIG. 1, a power conversion system 50 according to the present embodiment includes distributed power supply apparatuses 100 and a management apparatus 200 for distributed power supply apparatuses 100. Distributed power supply apparatus 100 is connected to a distribution system 300 at an interconnection point 301 to be interconnected to distribution system 300.

In Embodiment 1, power conversion system 50 may include any number of distributed power supply apparatuses 100, and may include one distributed power supply apparatus 100 or multiple distributed power supply apparatuses 100. Also, as shown in FIG. 1, one distributed power supply apparatus 100 may be directly interconnected to distribution system 300, or a combination of distributed power supply apparatuses 100 may be interconnected to distribution system 300.

Management apparatus 200 includes a communication unit 205 for transmitting and receiving information to and from each distributed power supply apparatus 100. In a configuration in which multiple distributed power supply apparatuses 100 are arranged, one management apparatus 200 centrally controls distributed power supply apparatuses 100. Communication unit 205 transmits and receives information for each prescribed period of time (e.g., 30 minutes) to and from distributed power supply apparatus 100. A communication protocol at this time may be, for example, OpenADR.

Distribution system 300 is supplied with electric power via a substation 500 and is connected with a step voltage regulator (hereinafter, merely referred to as SVR as well) 310. The positional relationship between SVR 310 and distributed power supply apparatus 100 is not limited to an example illustrated in FIG. 1, and distributed power supply apparatus 100 may be connected between substation 500 and SVR 310 in distribution system 300.

SVR 310 is configured to have a mechanical mechanism (e.g., tap switch) for switching a turn ratio between a primary winding and a secondary winding of a transformer, and controls a voltage of distribution system 300 (hereinafter, merely referred to as "system voltage" as well) by switching the turn ratio, as described above. Since voltage is adjusted by the mechanical mechanism, SVR 310 is effective for control of stabilizing a system voltage in response to long-term voltage fluctuations. However, frequent voltage adjustment may decrease a device life due to the use of the mechanical mechanism.

Also, the system voltage can be adjusted through input and output of reactive power by distributed power supply apparatus 100. Such reactive power control can adjust a system voltage in response to short-term voltage fluctuations. However, as distributed power supply apparatus 100 inputs and outputs reactive power, input and output of active power are limited in order to stay within an upper limit of apparent power. If distributed power supply apparatus 100 includes a solar battery as a power supply, thus, an opportunity of power generation may be lost. In another case, if distributed power supply apparatus 100 includes a storage battery as a power supply, charge and discharge power of the storage battery may be limited.

For the above reason, it is inadvisable to continuously respond to long-term fluctuations of the system voltage through reactive power control by distributed power supply apparatus 100. The distribution system in which the power conversion system according to the present embodiment is used accordingly responds to long-cycle fluctuations of the system voltage through voltage adjustment by SVR 310, while it responds to short-cycle fluctuations of the system voltage through reactive power control by distributed power supply apparatus 100 in which the power conversion system is used.

It is to be noted that in the distribution system that receives an inflow of electric power generated by sunlight, a conceivable cause of long-cycle voltage fluctuations is, for example, variations in an amount of sunlight associated with a solar altitude during a day. On the other hand, a conceivable cause of short-cycle voltage fluctuations is, for example, variations in an amount of sunlight over about several seconds which are associated with frequent changes between clear sky and cloudy sky.

Figure 2:
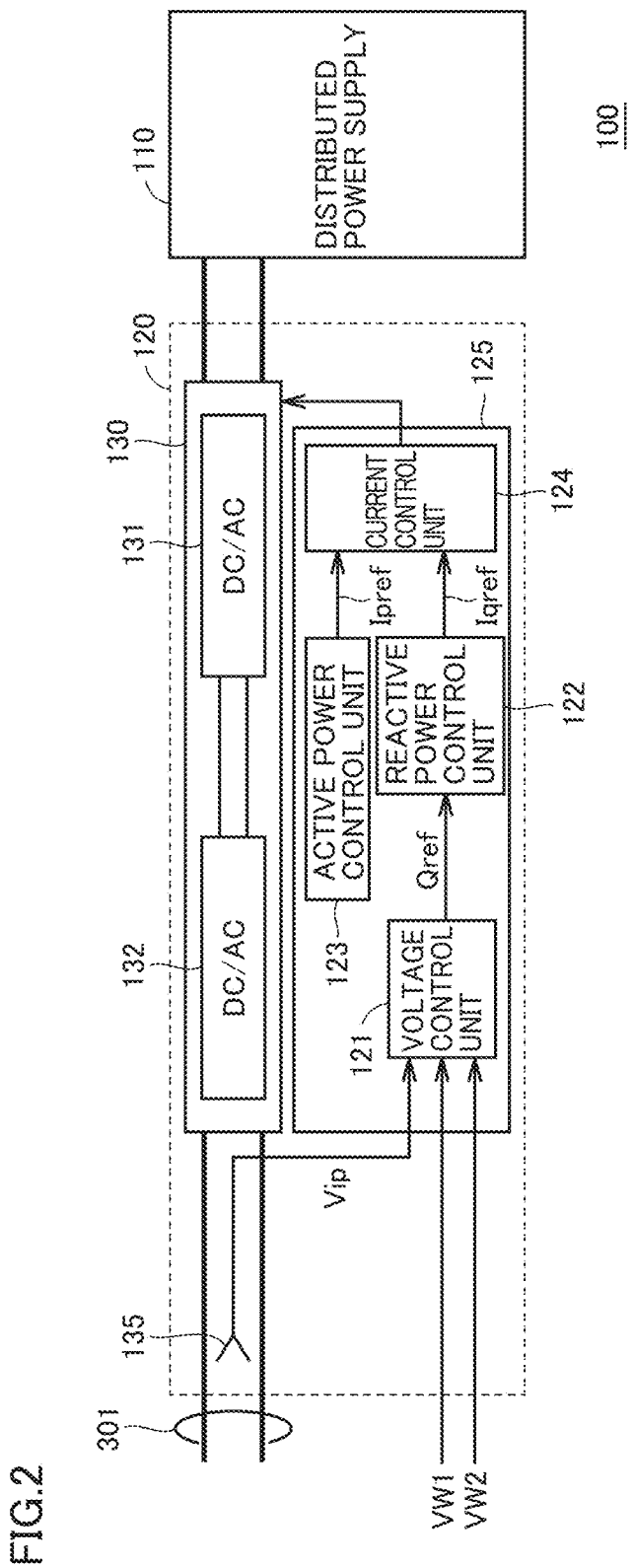
FIG. 2 is a block diagram illustrating an example configuration of a distributed power supply apparatus shown in FIG. 1.

FIG. 2 is a block diagram illustrating an example configuration of distributed power supply apparatus 100 shown in FIG. 1.

Referring to FIG. 2, distributed power supply apparatus 100 includes a distributed power supply 110 and a power conditioner 120. Power conditioner 120 includes a power conversion circuit 130 for controlling power conversion between distributed power supply 110 and distribution system 300 (interconnection point 301), a control operation unit 125 that controls power conversion circuit 130, and a voltage detector 135.

Although the present embodiment is described assuming that distributed power supply 110 is formed of a solar battery, distributed power supply 110 can be formed of a power generation element (e.g., aerogenerator) other than the solar battery, or a power storage element such as a storage battery or a capacitor.

Power conversion circuit 130 performs direct-current (DC)/alternating-current (AC) power conversion between distributed power supply 110 that outputs DC power and interconnection point 301 on distribution system 300 through which AC power is transmitted. For example, power conversion circuit 130 includes a DC/DC converter 131 and a DC/AC inverter 132. As well known, DC/DC converter 131 and DC/AC inverter 132 are configured to control electric power (voltage and current) that is input and output through on-off control of a semiconductor switching element (not shown). Control operation unit 125 accordingly generates an on-off command for the semiconductor switching element, thereby controlling power conversion circuit 130. It is to be noted that the configuration of power conversion circuit 130, including DC/DC converter 131 and DC/AC inverter 132, may be any known configuration.

Control operation unit 125 can be a microcomputer that implements a control process, which will be described below, through software processing or hardware processing. Control operation unit 125 includes a voltage control unit 121, a reactive power control unit 122, an active power control unit 123, and a current control unit 124.

Voltage detector 135 detects an AC voltage effective value Vip (hereinafter, merely referred to as "interconnection point voltage Vip" as well) of interconnection point 301 at which distributed power supply apparatus 100 is connected to distribution system 300. Upon receipt of an interconnection point voltage Vip from voltage detector 135, control operation unit 125 generates a control command to power conversion circuit 130 for controlling interconnection point voltage Vip. The control command includes the on-off command for the semiconductor switching element (not shown), as described above.

Figure 3:
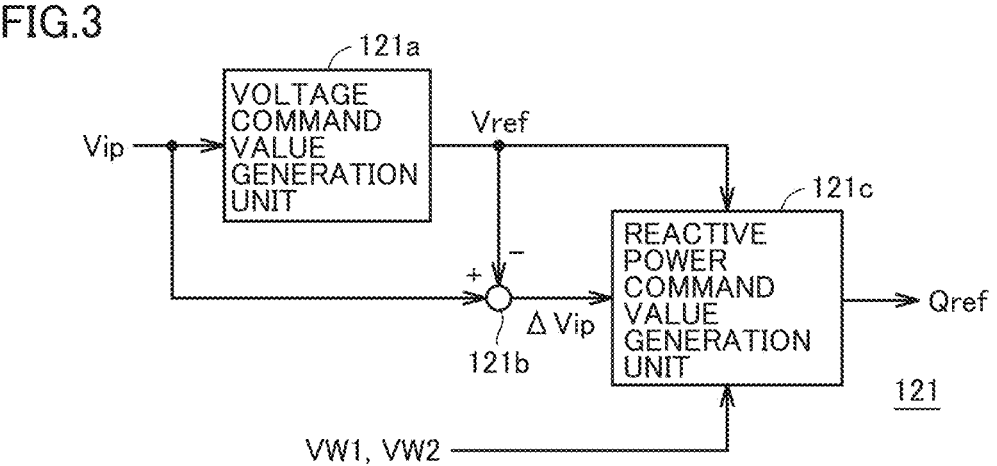
FIG. 3 is a block diagram illustrating an example configuration of a voltage control unit shown in FIG. 2.

FIG. 3 is a block diagram illustrating an example configuration of voltage control unit 121 shown in FIG. 2.

Referring to FIG. 3, voltage control unit 121 includes a voltage command value generation unit 121a, a subtraction unit 121b, and a reactive power command value generation unit 121c.

Voltage command value generation unit 121a removes voltage fluctuations of a high-frequency component from interconnection point voltage Vip detected by voltage detector 135, namely, voltage fluctuations resulting from short-cycle variations in the amount of sunlight which are caused by a short-term change of an amount of sunlight (clear sky and cloudy sky), thereby generating a voltage command value Vref of an interconnection point voltage. For example, voltage command value generation unit 121a can be configured using a primary low-pass filter, a time constant of which is about from several minutes to ten minutes. In generation of voltage command value Vref as described above, voltage fluctuations with a cycle shorter than the cycle (e.g., 30 minutes) in which information for setting first and second voltage ranges VW1, VW2 is transmitted from management apparatus 200 to distributed power supply apparatus 100 are removed.

Subtraction unit 121b subtracts, from interconnection point voltage Vip detected by voltage detector 135, voltage command value Vref from voltage command value generation unit 121a, thereby calculating a voltage deviation $\Delta \text{Vip} = \text{Vip} - \Delta \text{Vref}$. It is accordingly understood that voltage deviation $\Delta \text{Vip}$ indicates voltage fluctuations in a short period of time, which are removed by voltage command value generation unit 121a.

Reactive power command value generation unit 121c receives inputs of voltage command value Vref and voltage deviation $\Delta \text{Vip}$, and first voltage range VW1 and second voltage range VW2 transmitted from management apparatus 200. Reactive power command value generation unit 121c generates a reactive power command value Qref (effective value) based on these input values.

First and second voltage ranges VW1, VW2 indicate a threshold of voltage deviation $\Delta \text{Vip}$ to be removed through reactive power control. While reactive power control is turned off, when the absolute value of voltage deviation $\Delta \text{Vip}$ exceeds first voltage range VW1, that is, when interconnection point voltage Vip falls outside the voltage range of Vref−VW1 to Vref+VW1, reactive power control is started. Second voltage range VW2 is set to a value smaller than first voltage range VW1.

The information for setting first and second voltage ranges VW1, VW2 is transmitted from management apparatus 200 to each distributed power supply apparatus 100 as part of the information which is transmitted and received for each prescribed period of time (e.g., 30 minutes) as described above. It is accordingly understood that in distributed power supply apparatus 100, the cycle of voltage fluctuations to be removed through reactive power control is shorter than the cycle of update of the first and second voltage ranges. It is to be noted that in the configuration in which multiple distributed power supply apparatuses 100 are arranged, first and second voltage ranges VW1, VW2 are separately set for each distributed power supply apparatus 100.

Referring again to FIG. 2, reactive power control unit 122 generates a reactive current command value Iqref from reactive power command value Qref and interconnection point voltage Vip and sends reactive current command value Iqref to current control unit 124. For example, reactive current command value Iqref (instantaneous value) can be calculated in accordance with Equation (1) with the use of a voltage phase $\theta$ detected by a phase synchronizer (not shown).

$$\text{Iqref} = \sqrt{2} \cdot (\text{Qref}/\text{Vip}) \cdot \cos \theta \quad (1)$$

Active power control unit 123 generates an active current command value Ipref (instantaneous value) from an active power command value Pref (effective value) and sends active current command value Ipref to current control unit 124. Active current command value Ipref (instantaneous value) can be calculated in accordance with Equation (2) below with the use of voltage phase $\theta$ that is common with Equation (1).

$$\text{Ipref} = \sqrt{2} \cdot \text{Pref} \cdot \sin \theta \quad (2)$$

It is to be noted that active power command value Pref may be supplied directly from management apparatus 200 or calculated by active power control unit 123 based on information received from management apparatus 200. In any case, reactive power command value Qref and active power command value Pref have to be set within the range of an apparent power upper limit PAmax of power conditioner 120 (power conversion circuit 130), that is, within the range of Equation (3) below. In other words, if a square root of sum of squares of active power command value Pref and reactive power command value Qref is greater than PAref, active power command value Pref is limited beyond its original value.

$$P\text{Amax} \geq \sqrt{(\text{Pref}^2 + \text{Qref}^2)} \quad (3)$$

Current control unit 124 calculates a current command value Iref (instantaneous value) from the sum of reactive current command value Iqref (instantaneous value) from reactive power control unit 122 and active current command value Ipref (instantaneous value) from active power control unit 123. In other words, current command value $\text{Iref} = \sqrt{2} \cdot (\text{Qref}/\text{Vip}) \cdot \cos \theta + \sqrt{2} \cdot \text{Pref} \cdot \sin \theta$.

Current control unit 124 further generates an on-off command for the semiconductor switching element of power conversion circuit 130 (DC/AC inverter 132) so as to compensate for a current deviation between an output current (instantaneous value) from power conversion circuit 130 to interconnection point 301, which is detected by a current sensor (not shown), and current command value Iref. As power conversion circuit 130 (DC/AC inverter 132) is operated at a switching frequency much higher than a current frequency (commercial system frequency) at interconnection point 301, the semiconductor switching element is turned on and off to switch between increase and decrease in output current, allowing control of an instantaneous value of an output current in line with current command value Iref (instantaneous value) that changes in accordance with a system frequency. Such current control can control active power and reactive power that are input and output between power conditioner 120 and interconnection point 301 (distribution system 300).

It is to be noted that distributed power supply apparatus 100 and power conditioner 120 each can have a configuration different from that of the example shown in FIG. 2. Although FIG. 2 shows the example in which distributed power supply apparatus 100 is interconnected to distribution system 300 in a single phase, distributed power supply apparatus 100 may also be interconnected in three phases.

Figure 4:
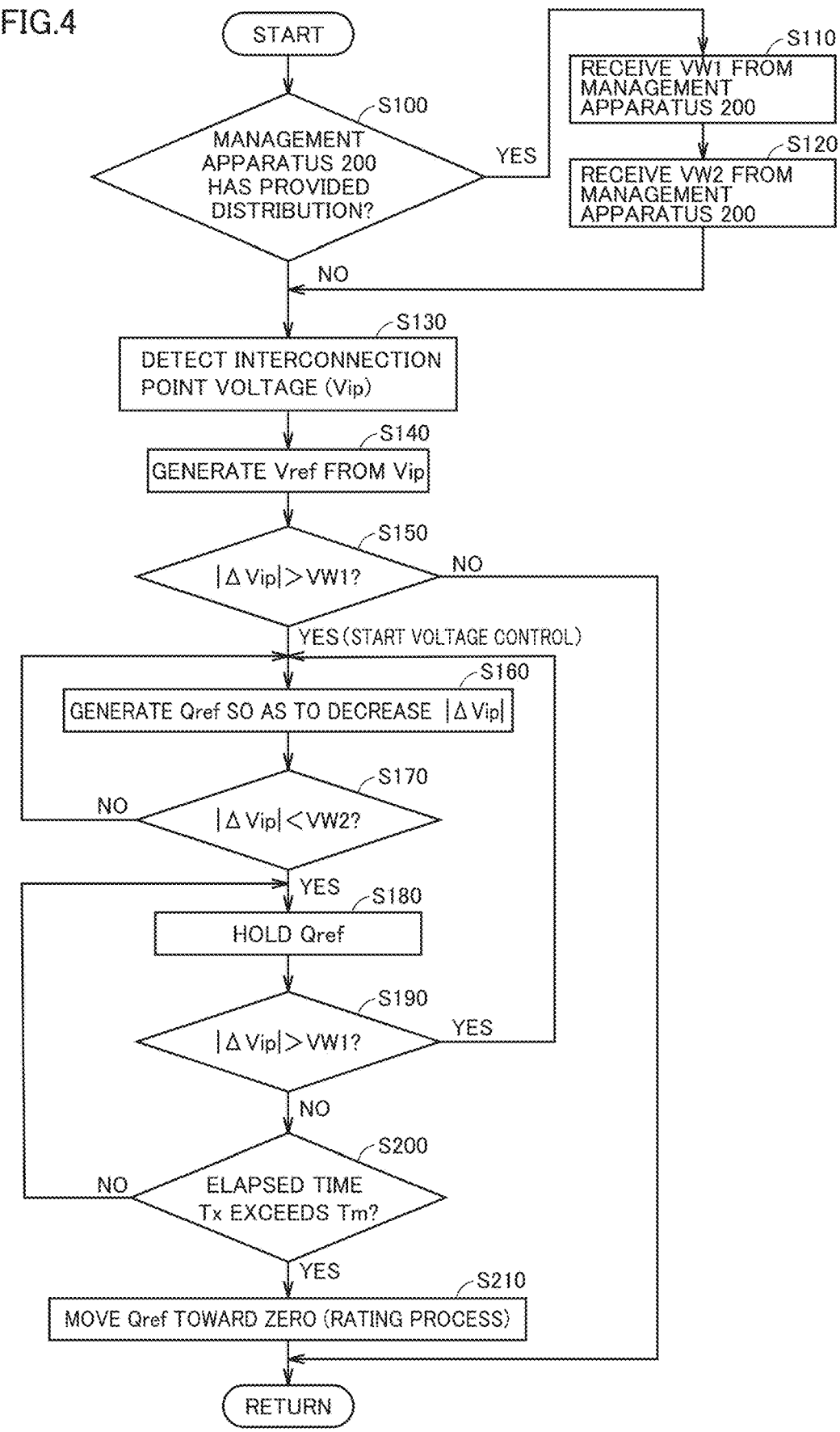
FIG. 4 is a flowchart illustrating an example process of reactive power control in the distributed power supply apparatus.

FIG. 4 is a flowchart illustrating an example process of reactive power control in distributed power supply apparatus 100. The control process shown in FIG. 4 can be performed repeatedly by control operation unit 125 of FIG. 2.

At step (hereinafter, merely referred to as "S") 100, control operation unit 125 determines whether management apparatus 200 has provided a distribution for each prescribed period of time (e.g., 30 minutes), and when a distribution has been provided (when determination is YES at S100), updates first voltage range VW1 at S110 and updates second voltage range VW2 at S120, based on information received from management apparatus 200.

Control operation unit 125 detects interconnection point voltage Vip (effective value) from an output value of voltage detector 135 at S130 and generates voltage command value Vref from interconnection point voltage Vip at S140. The process at S140 corresponds to the function of voltage command value generation unit 121a described above.

At S150, control operation unit 125 compares an absolute value of voltage deviation $\Delta \text{Vip}$ ($\Delta \text{Vip} = \text{Vip} - \text{Vref}$) of interconnection point voltage Vip with respect to voltage command value Vref with first voltage range VW1 (S110), thereby determining whether it is necessary to start voltage control through reactive power control (hereinafter, merely referred to as reactive power control as well).

When $|\Delta Vip| \leq VW1$ (when determination is NO at S150), reactive power control is kept in the off state, the processes of S160 to S210, which will be described below, are skipped, and the process proceeds to "RETURN". In this case, the process of FIG. 4 is performed again after a lapse of a predetermined control cycle. In other words, while reactive power control is turned off, whether to start reactive power control is determined at S150 for each certain control cycle.

Control operation unit 125 starts reactive power control when $|\Delta Vip|$ exceeds first voltage range VW1 (when determination is YES at S150), and moves the process to S160. At S160, reactive power command value Qref is generated so as to decrease $|\Delta Vip|$. For example, reactive power command value Qref can be calculated in accordance with common proportional integral (PI) control in accordance with Equation (4) below. In Equation (4), Kp is a control gain, T is a time constant that defines a convergence time, and s is a Laplace operator.

$$Qref = \Delta Vip \cdot Kp(1 + 1/(s/T)) \quad (4)$$

During adjustment of reactive power according to reactive power command value Qref set at S160, $|\Delta Vip|$ is compared with second voltage range VW2 at S170. While $|\Delta Vip|$ is not less than voltage range VW2 (when determination is NO at S170), S160 is performed for each control cycle described above, thereby updating reactive power command value Qref so as to decrease $|\Delta Vip|$.

When $|\Delta Vip|$ falls below voltage range VW2 through adjustment of reactive power according to reactive power command value Qref (S160) (when determination is YES at S170), control operation unit 125 performs the process of ending the reactive power control at S180 to S200. At S180, reactive power command value Qref at this timing is held. At S190, whether $|\Delta Vip|$ exceeds first voltage range VW1 during the period in which reactive power command value Qref is held at S180 is monitored. When determination is YES at S170, at S200, an elapsed time Tx from start of holding reactive power command value Qref is compared with a predetermined holding time Tm.

Until elapsed time Tx exceeds holding time Tm (when determination is NO at S200), control operation unit 125 returns the process to S180. As a result, when $|\Delta Vip|$ falls below second voltage range VW2 through the reactive power control, a holding time (holding time Tm), during which reactive power command value Qref at that point of time is held and reactive power is generated, is provided. When $|\Delta Vip|$ again exceeds the first voltage range during the holding period, and when determination is YES at S190, the process returns to S160. Then, the adjustment of reactive power, through which reactive power command value Qref is generated so as to decrease $|\Delta Vip|$, is restarted.

When elapsed time Tx exceeds holding time Tm (when determination is YES at S200), that is, when the holding period ends, control operation unit 125 performs a rating process of gradually moving reactive power command value Qref toward zero at S210. For example, reactive power command value Qref is moved toward zero at a constant rate by $\Delta Qr$ (hereinafter, also referred to as a rate value $\Delta Qr$) per control cycle.

When reactive power command value Qref is returned to zero at S210, the reactive power control ends, and the process proceeds to "RETURN". Control operation unit 125 again starts the process of FIG. 4 in the following control cycle. It is to be noted that information for setting holding time Tm and rate value $\Delta Qr$ can also be transmitted from management apparatus 200 to distributed power supply apparatus 100 for each prescribed period of time (e.g., 30 minutes), similarly to the information for setting first and second voltage ranges VW1, VW2.

Figure 5:
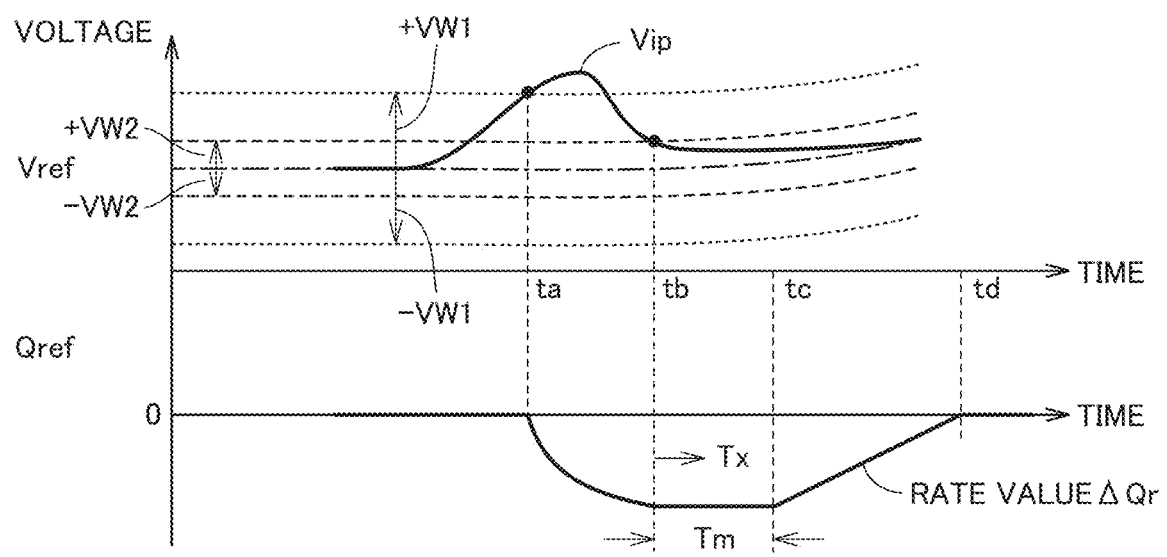
FIG. 5 is a control waveform chart illustrating an example operation of the reactive power control in the distributed power supply apparatus.

FIG. 5 is a control waveform chart illustrating an example operation of reactive power control in a distributed power supply apparatus. It is to be noted that first and second voltage ranges VW1, VW2 are not updated and are maintained at constant values within the time range shown in FIG. 5.

Referring to FIG. 5, during a period until a time ta, interconnection point voltage Vip is within the voltage range from Vref−VW1 to Vref+VW1, and accordingly, reactive power control is turned off and maintained at a reactive power command value Qref=0.

When Vip>Vref+VW1 at time ta, determination is YES at S150 of FIG. 4, and the reactive power control is started. After time ta, reactive power command value Qref is set to a negative value at S160 of FIG. 4 so as to decrease $|\Delta Vip|$, that is, decrease interconnection point voltage Vip. $|\Delta Vip|$ starts decreasing when the absolute value of reactive power command value Qref increases, and then, Vip<Vref+VW2 at a time tb, so that determination is YES at 170 of FIG. 4. In contrast, determination is NO at S170 during a period from times ta to tb.

During a period from time tb to a time tc at which holding time Tm elapses, determination is NO at S200 of FIG. 4, and reactive power command value Qref at time tb is maintained (S180 of FIG. 4). In other words, a holding period is provided during the period from times tb to tc. After time tc, reactive power command value Qref is moved to zero at a constant rate at S210 of FIG. 4, and when Qref=0 at a time td, reactive power control according to voltage fluctuations at time ta ends.

In this manner, the power conversion system according to Embodiment 1 can perform reactive power control by distributed power supply apparatus 100 so as to maintain interconnection point voltage Vip within a constant voltage range from voltage command value Vref obtained by removing a voltage fluctuation component during a short period of time from interconnection point voltage Vip. Thus, voltage fluctuations of interconnection point voltage Vip within a short period of time can be removed through autonomous control of distributed power supply apparatus 100 even in a situation where the information from management apparatus 200 (first and second voltage ranges VW1, VW2) is not updated.

As a result, the power conversion system according to Embodiment 1 can stabilize a system voltage through autonomous control in distributed power supply apparatus 100 without increasing an operation load on the management apparatus 200 side. Alternatively, a system voltage can be stabilized efficiently by control in a manner of responding to long-term voltage fluctuations on the system side (e.g., step voltage regulator 310) while responding to short-term voltage fluctuations through reactive power control in distributed power supply apparatus 100.

It is to be noted that reactive power command value Qref can be moved toward zero by omitting providing the holding period (Tm=0) and performing the rating process (S210) from a point of time (time tb of FIG. 5) at which $|Vip|<VW2$. It is to be noted that the stability of interconnection point voltage Vip can be increased by providing the holding period (times tb to tc of FIG. 5).

Figure 6:
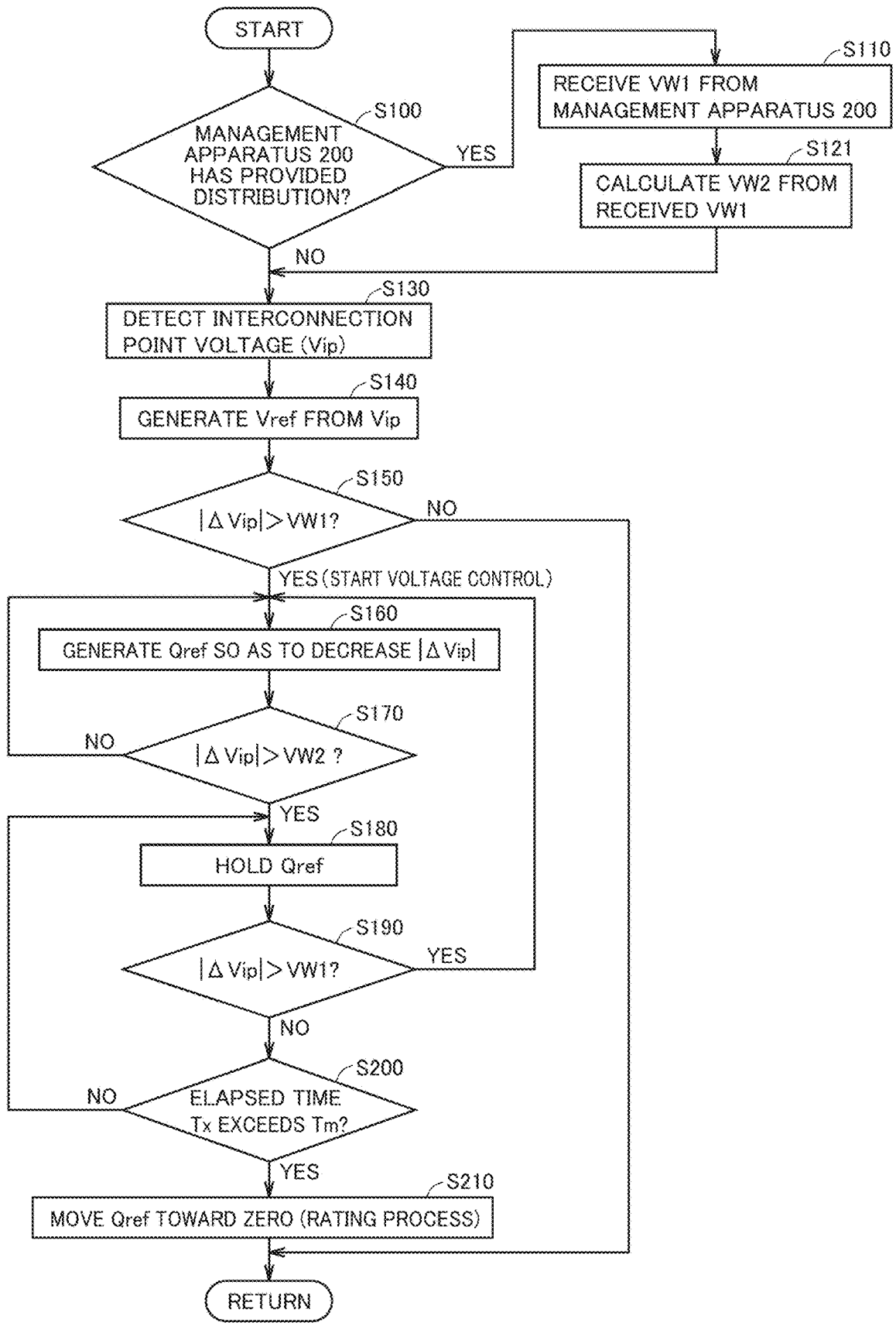
FIG. 6 is a flowchart illustrating another example process of the reactive power control in the distributed power supply apparatus.

FIG. 6 is a flowchart illustrating another example process of the reactive power control in a distributed power supply apparatus.

In comparison, the control process of FIG. 6 differs from that of FIG. 4 in that S121 is performed in place of S120 of FIG. 4.

At S120, control operation unit 125 calculates second voltage range VW2 on the distributed power supply apparatus 100 side from first voltage range VW1 updated using the information received from management apparatus 200 at S110. It is to be noted that second voltage range VW2 needs to be set to a value smaller than first voltage range VW1. For example, at S121, second voltage range VW2 can be calculated assuming that VW2=α·VW1 using a predetermined coefficient α (0<α<1.0).

The other steps of the flowchart of FIG. 6 are similar to those of FIG. 4, detailed description of which will not be repeated. In other words, reactive power control based on the set second voltage range VW2 is performed through a process similar to that described with reference to FIG. 4. Alternatively, in contrast to the process of FIG. 4, first voltage range VW1 can also be calculated on the distributed power supply apparatus 100 side (control operation unit 125) from second voltage range VW2 received from management apparatus 200 such that VW1>VW2.

In this manner, the power conversion system according to the present embodiment can periodically transmit information about at least one of first voltage range VW1 and second voltage range VW2 from management apparatus 200 to distributed power supply apparatus 100, thereby performing reactive power control by distributed power supply apparatus 100 to respond to short-term system voltage fluctuations, which has been described in Embodiment 1.

Embodiment 2

The reactive power control described in Embodiment 1 can be completed for each distributed power supply apparatus 100 with the use of the first and second voltage ranges based on the information transmitted from management apparatus 200. On the other hand, since the reactive power control by distributed power supply apparatus 100 is performed within the range of the apparent power upper limit of power conditioner 120 (power conversion circuit 130), active power that is input and output decreases as reactive power is input and output for the stabilization of a system voltage. Accordingly, the power conversion system in which distributed power supply apparatuses 100 are connected to distribution system 300 is required to balance reactive power that is input and output among distributed power supply apparatuses 100.

Embodiment 2 will describe control for balancing reactive power among distributed power supply apparatuses 100 through adjustment of first and second voltage ranges VW1, VW2 which are set for each distributed power supply apparatus 100.

Figure 7:
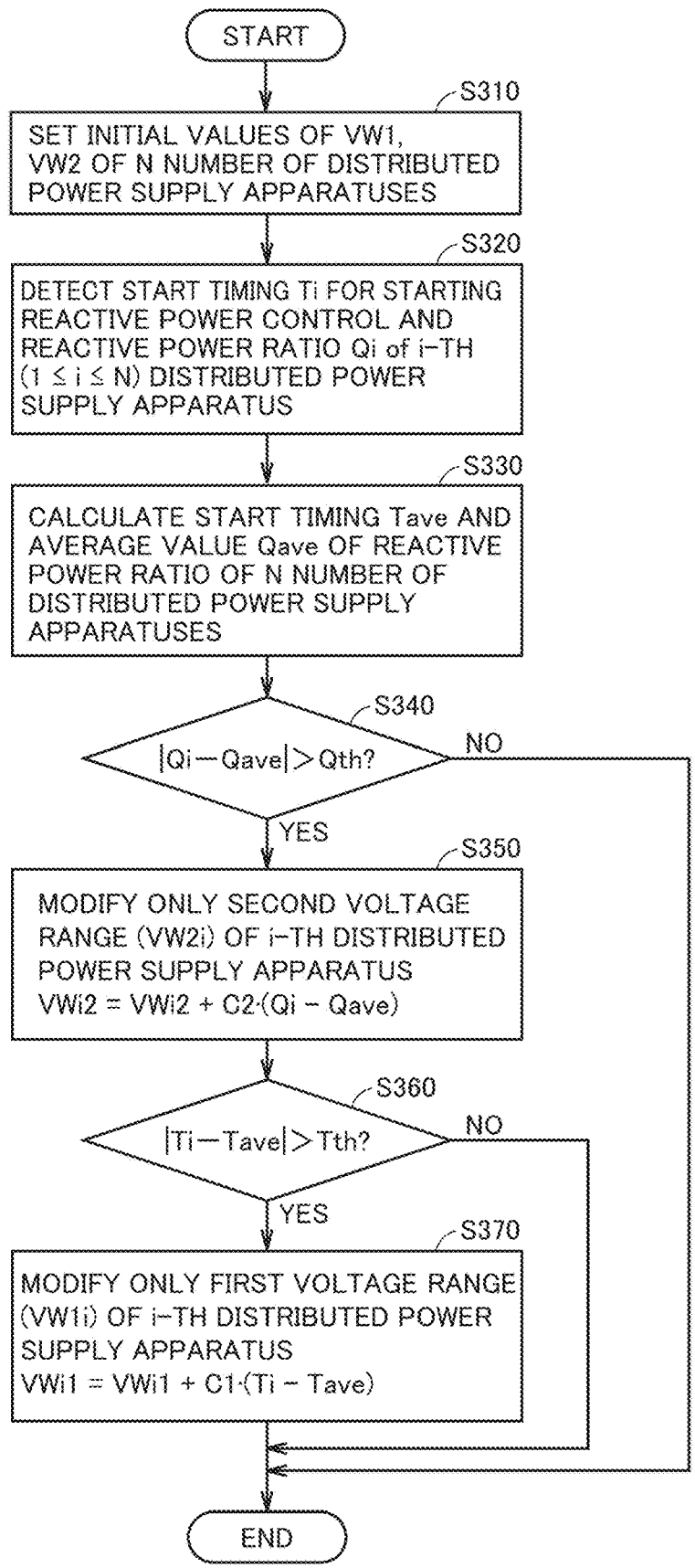
FIG. 7 is a flowchart illustrating a control process of setting first and second voltage ranges in a plurality of distributed power supply apparatuses in a power conversion system according to Embodiment 2.

FIG. 7 is a flowchart illustrating a control process of setting first and second voltage ranges of multiple distributed power supply apparatuses in a power conversion system according to Embodiment 2. The control process of FIG. 7 shows the process of setting a first voltage range VW1$i$ and a second voltage range VW2$i$ of an i-th distributed power supply apparatus 100 of N (N is an integer not less than two) number of distributed power supply apparatuses 100 connected to distribution system 300. The control process shown in FIG. 7 can be performed by management apparatus 200, for example, every time an actual result value of reactive power control is transmitted from distributed power supply apparatus 100 to management apparatus 200 for each prescribed period of time (e.g., 30 minutes).

Referring to FIG. 7, management apparatus 200 sets initial values of first voltage range VW1 and second voltage range VW2 of N number of distributed power supply apparatuses 100 at S310. The initial values may be predetermined fixed values or present values of N number of VW1 and VW2. Management apparatus 200 further detects a start timing Ti for starting reactive power control and a reactive power ratio Qi in i-th distributed power supply apparatus 100 (power conditioner 120) at S320. Start timing Ti is a parameter for quantitatively distinguishing whether it is before or after the start timing (time to of FIG. 5) of reactive power control among N number of distributed power supply apparatuses 100, which is, for example, set to a greater value as the start timing is earlier, and set to zero or a predetermined negative value when reactive power control has not been performed.

Reactive power ratio Qi can be a value obtained by dividing reactive power during the holding period (from times tb to tc of FIG. 5) of reactive power control by rated apparent power of power conversion circuit 130 of distributed power supply apparatus 100. In other words, it is understood that reactive power control tends to be started more easily as the value of start timing Ti is greater, and a larger amount of reactive power is input and output as reactive power ratio Qi is greater.

At S330, management apparatus 200 calculates an average value Tave of start timing Ti and an average value Qave of reactive power ratio Qi among N number of distributed power supply apparatuses 100. At S240, further, |Qi−Qave| is compared with a predetermined threshold Qth.

When |Qi−Qave|>Qth (when determination is YES at S340), at S350, management apparatus 200 modifies second voltage range VW2$i$ of i-th distributed power supply apparatus 100 in accordance with Equation (5) using a predetermined coefficient C1.

$$VW2i = VW2i + C2 \cdot (Qi - Q\text{ave}) \quad (5)$$

At S360, management apparatus 200 further compares |Ti−Tave| with predetermined threshold Tth. When |Ti−Tave|>Tth (when determination is YES at S360), at S370, first voltage range VW1$i$ of i-th distributed power supply apparatus 100 is modified in accordance with Equation (6) below using predetermined coefficient C1.

$$VW1i = VW1i + C1 \cdot (Ti - T\text{ave}) \quad (6)$$

In this case, it is preferable to apply Equation (6) by performing a guard process of preventing |Ti−Tave| from exceeding upper limit Timax for modification such that (Ti−Tave)=Timax when (Ti−Tave)>Timax and for modification such that (Ti−Tave)=−Timax when (Ti−Tave)<−Timax. It is to be noted that upper limit Timax can be determined in advance within the range of, for example, about several tens of seconds to about several hundreds of seconds.

Contrastingly, when |Qi−Qave|≤Qth (when determination is NO at S340), S350 to S370 are skipped, and first voltage range VW1$i$ and second voltage range VW2$i$ are maintained at the values at S310. When |Ti−Tave|≤Tth (when determination is NO at S370), S370 is skipped, and first voltage range VW1$i$ is modified at S350, whereas second voltage range VW2$i$ is maintained at the value at S310.

At least the processes of S340 to S370 can be performed for N number of distributed power supply apparatuses 100 to separately set first voltage range VW1 and second voltage range VW2. Accordingly, reactive power can be decreased by extending second voltage range VW2 in distributed power supply apparatus 100, whose reactive power input and output through reactive power control is greater than an average value, among multiple (N number of) distributed power supply apparatuses 100.

Similarly, reactive power control can be started less easily by extending first voltage range VW1 in distributed power supply apparatus 100, whose start timing in reactive power control is earlier than an average value, among multiple (N number of) distributed power supply apparatuses 100.

Figure 8A:
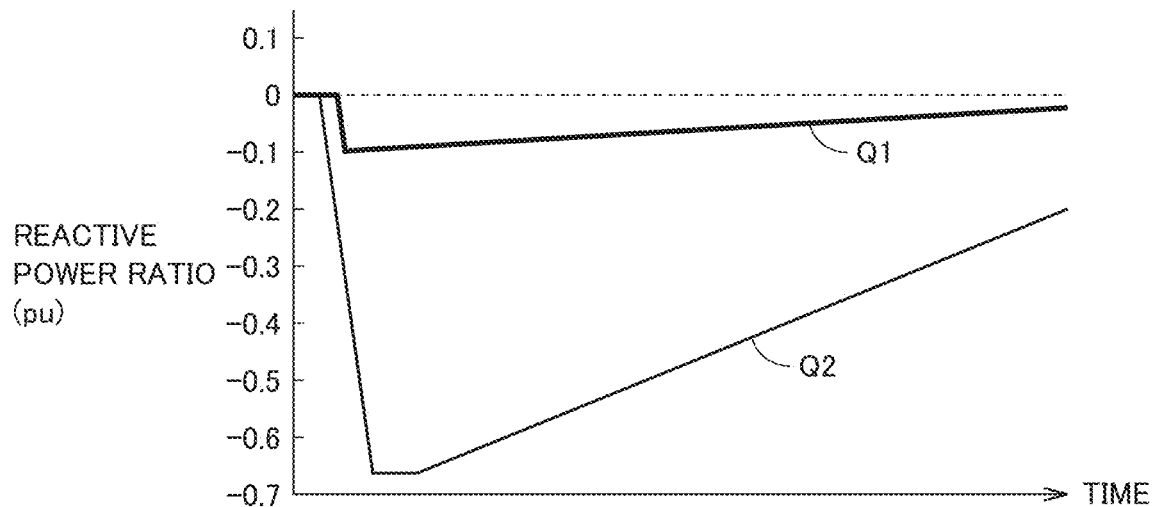
FIG. 8A is a first control waveform chart for comparison of a state of reactive power control with respect to the first and second voltage ranges.
Figure 8B:
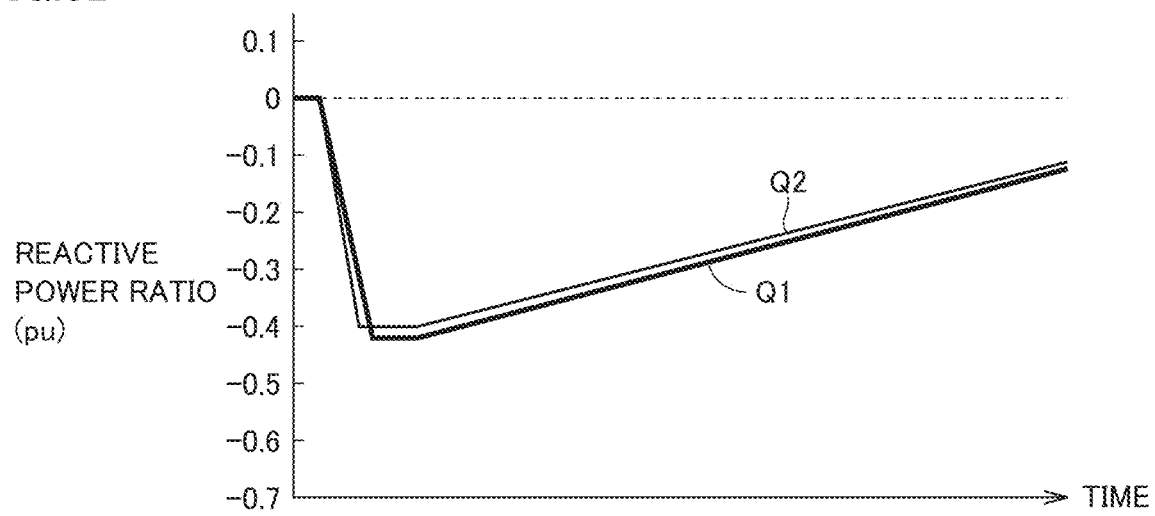
FIG. 8B is a second control waveform chart for comparison of a state of the reactive power control with respect to the first and second voltage ranges.

FIGS. 8A and 8B are first and second control waveform charts for comparison of the state of reactive power control with respect to first and second voltage ranges, respectively. FIGS. 8A and 8B show simulation results when two distributed power supply apparatuses 100 are connected to a distribution system (N=2).

A reactive power ratio Q1 in FIGS. 8A and 8B indicates, in a first (i=1) distributed power supply apparatus 100, a ratio of reactive power input and output to and from this distributed power supply apparatus 100 (i=1) to an apparent power rated value of power conversion circuit 130. Similarly, a reactive power ratio Q2 indicates, in a second (i=2) distributed power supply apparatus 100, a ratio of reactive power input and output to and from this distributed power supply apparatus 100 (i=2) to the apparent power rated value of power conversion circuit 130.

In FIG. 8A, first voltage range VW1 is the same and second voltage range VW2 is the same between two distributed power supply apparatuses 100. Accordingly, in the second (i=2) distributed power supply apparatus 100, reactive power control starts at an earlier timing than in the first (i=1) distributed power supply apparatus 100, and an absolute value of reactive power ratio Q2 is greater than an absolute value of reactive power ratio Q1. In other words, in the state of FIG. 8A, reactive power input and output to and from the second (i=2) distributed power supply apparatus 100 is large, and sharing of reactive power for the stabilization of a system voltage is uneven.

Contrastingly, in FIG. 8B, first voltage range VW1 of the second distributed power supply apparatus 100 is reduced than in FIG. 8A so as to be a smaller value than first voltage range VW1 of the first distributed power supply apparatus 100. This allows start timings of reactive power control to coincide with each other between two distributed power supply apparatuses 100.

Moreover, in FIG. 8B, second voltage ranges VW2 of two distributed power supply apparatuses 100 are changed from the value in FIG. 8A such that second voltage range VW2 of the first distributed power supply apparatus 100 is smaller than second voltage range VW2 of the second distributed power supply apparatus 100. As a result, reactive power ratios Q1 and Q2 during reactive power control are also adjusted so as to exhibit similar behaviors. It is accordingly understood that sharing of reactive power for the stabilization of a system voltage is balanced between two distributed power supply apparatuses 100 through adjustment of first and second voltage ranges VW1, VW2 in FIG. 8B.

In this manner, the power conversion system according to Embodiment 2 can adjust first and second voltage ranges VW1, VW2 of distributed power supply apparatuses 100 in accordance with an actual result value of the reactive power control performed in distributed power supply apparatuses 100. This can reduce uneven sharing of reactive power for the stabilization of a system voltage among distributed power supply apparatuses 100, leading to even sharing.

Embodiment 3

In the reactive power control described in Embodiment 1, holding time Tm and rate value ΔQ in the rating process of moving reactive power command value Qref after a lapse of the holding time toward zero also affect reactive power input and output to and from each distributed power supply apparatus 100.

Specifically, an excessively long holding time Tm results in an excessive amount of reactive power input and output, leading to a fear that input and output of active power, which are original operations, may be excessively limited. In contrast, an excessively short holding time Tm may excessively increase a sharing amount of reactive power in the other distributed power supply apparatus 100 after start of the rating process in one distributed power supply apparatus 100. Thus, a longer holding time Tm is preferable in case of unstable behavior of reactive power control in each distributed power supply apparatus 100.

Holding time Tm, which is set such that Tm=5 minutes, for example, can eliminate or reduce voltage fluctuations within approximately five minutes through reactive power control by distributed power supply apparatus 100, while it adjusts longer-term voltage fluctuations by step voltage regulator 310. In other words, holding time Tm corresponds to a boundary value of coordinative control sharing between reactive power control of distributed power supply apparatus 100 and step voltage regulator 310. Thus, a longer holding time Tm is preferable when step voltage regulator 310 hardly operates, whereas a shorter holding time Tm is preferable when step voltage regulator 310 frequently operates.

For these reasons, holding time Tm is preferably set to an appropriate value based on the actual operation result of a power conversion system which includes reactive power control.

FIG. 9 is a flowchart illustrating a control process of setting a holding time in reactive power control of a distributed power supply apparatus in a power conversion system according to Embodiment 3. The control process shown in FIG. 9 can be performed by management apparatus 200, for example, every time an actual result value of reactive power control is transmitted from distributed power supply apparatus 100 to management apparatus 200 for each prescribed period of time (e.g., 30 minutes). It is to be noted that holding time Tm is common among all distributed power supply apparatuses 100.

Referring to FIG. 9, management apparatus 200 sets an initial value of holding time Tm at S410. The initial value may be a predetermined fixed value or a present time of holding time Tm. At S420, management apparatus 200 further sets a maximum time Tmax, which is a maximum value of holding time Tm. Maximum time Tmax may be a predetermined fixed value or may be set variably in accordance with an actual operation result of step voltage regulator 310 as described above. For example, a shorter maximum time Tmax can be set as step voltage regulator 310 operates more frequently within a period going back a certain period of time from the present time, whereas a longer maximum time Tmax can be set as step voltage regulator 310 operates less frequently within the period.

At S430, management apparatus 200 compares holding time Tm set at S410 with maximum time Tmax set at S420. When Tm>Tmax (when determination is YES at S430), holding time Tm is cleared such that Tm=0 at S440, and then, the process of S450 and the following processes are performed. In contrast, when Tm<Tmax (when determination is NO at S430), holding time Tm read at S410 is maintained, and then, the process of S450 and the following processes are performed.

At S450, management apparatus 200 obtains an actual result value of a holding timing Th (time tb of FIG. 5) in reactive power control from each of multiple (N number of) distributed power supply apparatuses 100. For example, holding timing Th is defined by a time difference between a start timing (time to of FIG. 5) of reactive power control and a start timing (time tb of FIG. 5) for holding reactive power command value Qref in each distributed power supply apparatus 100. Alternatively, holding timing Th can also be defined by an elapsed time from a start timing of reactive power control in distributed power supply apparatus 100 that has started reactive power control earliest to a start timing (time tb of FIG. 5) for holding reactive power command value Qref in each distributed power supply apparatus 100.

At S460, management apparatus 200 extracts a holding timing T1 in distributed power supply apparatus 100 that holds reactive power earliest and a holding timing T2 in distributed power supply apparatus 100 that holds reactive power latest among holding timings Th in N number of distributed power supply apparatuses 100.

Management apparatus 200 further determines whether (T2−T1)>Tm is satisfied at S470, and when (T2−T1)>Tm (when determination is YES at S470), increases holding time Tm by a predetermined incremental value Ta (Ta>0) at S480.

At S490, holding time Tm increased at S480 is compared with maximum time Tmax set at S420. When Tm>Tmax, holding time Tm is modified such that Tm=Tmax at S495, and then, the process ends. Through the loop process of S470 to S490, holding time Tm is set to be not less than the actual result value (T2−T1), and also, is guarded to be not greater than maximum time Tmax.

In this manner, the power conversion system according to Embodiment 3 can appropriately set the length of the holding time in each distributed power supply apparatus 100 in accordance with a time difference of the holding timing for reactive power among distributed power supply apparatuses 100. Specifically, when the time difference of the holding timing is long, a long holding time Tm can be set to prevent uneven input and output of reactive power to and from a specific distributed power supply apparatus 100.

In the power conversion system according to Embodiment 3, rate value ΔQr in the rating process in reactive power control is preferably set to an appropriate value based on the actual operation result of the power conversion system which includes reactive power control.

Figure 10:
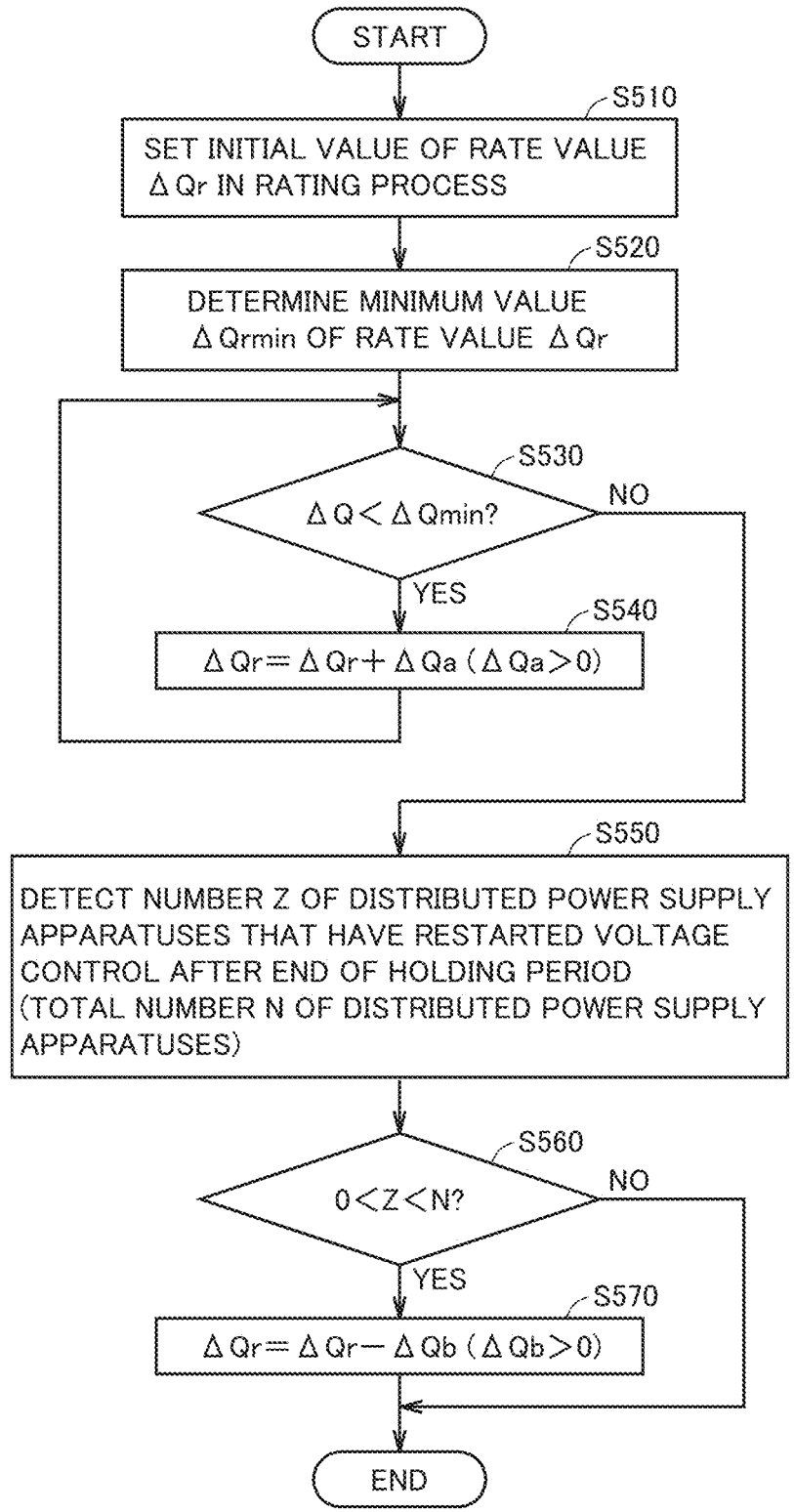
FIG. 10 is a flowchart illustrating a control process of setting a rate value in a rating process in the reactive power control of the distributed power supply apparatus in the power conversion system according to Embodiment 3.

FIG. 10 is a flowchart illustrating a control process of setting rate value ΔQr in the rating process in reactive power control of the distributed power supply apparatus in the power conversion system according to Embodiment 3. The control process shown in FIG. 10 can also be performed by management apparatus 200, for example, every time an actual result value of reactive power control is transmitted from distributed power supply apparatus 100 to management apparatus 200 for each prescribed period of time (e.g., 30 minutes). It is to be noted that rate value ΔQr is common among all distributed power supply apparatuses 100.

Referring to FIG. 10, management apparatus 200 sets an initial value of rate value ΔQr at S510. The initial value may be a predetermined fixed value or a present value of ΔQr. At S420, management apparatus 200 further sets a minimum value ΔQrmin of rate value ΔQr. Minimum value ΔQrmin may be a predetermined fixed value, and for example, may be set to such a value that does not cause control hunting by linking minimum value ΔQrmin with a time constant at the removal of voltage fluctuations of a high-frequency component in voltage command value generation unit 121a (FIG. 3).

At S530, management apparatus 200 compares rate value ΔQr set at S510 with minimum value ΔQrmin set at S520. When ΔQr<ΔQrmin (when determination is YES at S530), ΔQr is increased by a predetermined incremental value ΔQa (ΔQa>0) at S540. The process of S540 is repeated until the increased rate value ΔQr is not less than minimum value ΔQrmin, that is, until determination is NO at S530.

When determination is NO at S530, management apparatus 200 moves the process to S550. At this point of time, it is understood that rate value ΔQr corresponds to a value set at S510 (when ΔQr>ΔQrmin) or ΔQrmin (when ΔQr≤ΔQrmin).

As voltage deviation |ΔVip| between interconnection point voltage Vip and voltage command value Vref again exceeds the first voltage range after the end of the holding period (after time tc of FIG. 5) from the actual result of reactive power control in N number of distributed power supply apparatuses 100, at S550, management apparatus 200 detects the number (Z) of distributed power supply apparatuses 100 that have restarted voltage control from actual result data about reactive power control which is transmitted from each distributed power supply apparatus 100 to management apparatus 200.

At S560, management apparatus 200 determines whether the number Z detected at S550 is such that 0<Z<N, and when Z=0, that is, when voltage control has not been restarted in all distributed power supply apparatuses 100, or when Z=N, that is, when it is conceivable that voltage control has been restarted in all distributed power supply apparatuses 100 and another disturbance has occurred (when determination is NO at S560), rate value ΔQr at the point of time when the process has proceeded to S550 is maintained.

Contrastingly, when the number Z detected at S550 is such that 0<Z<N (when determination is YES at S560), at S570, a predetermined value ΔQb (ΔQb>0) is subtracted from the value at the point of time when the process has proceeded to S550, and then, a new rate value ΔQr is set.

In this manner, the power conversion system according to Embodiment 3 can reduce rate value ΔQr when voltage control is restarted after holding timing (time tb of FIG. 5) in some distributed power supply apparatuses 100, while taking minimum value ΔQrmin as a reference for rate value ΔQr in the rating process at the end of reactive power control. This can eliminate or reduce a malfunction (hunting) in which voltage control is ended and restarted repeatedly in a short cycle.

The power conversion system according to Embodiment 3 may perform one of the process of setting holding time Tm (FIG. 9) and the process of setting rate value ΔQ (FIG. 10) and can perform both the processes. Alternatively, a modification in which a holding period is not provided such that Tm=0 is possible as described above, and in such a case, the processes of FIG. 9 are not required.

Embodiment 4

Embodiment 4 will describe an example in which a command value to distributed power supply apparatus 100 is set using a neural network model. As the command value to distributed power supply apparatus 100, setting of first voltage range VW1 and second voltage range VW2 will be described representatively herein.

Figure 11:
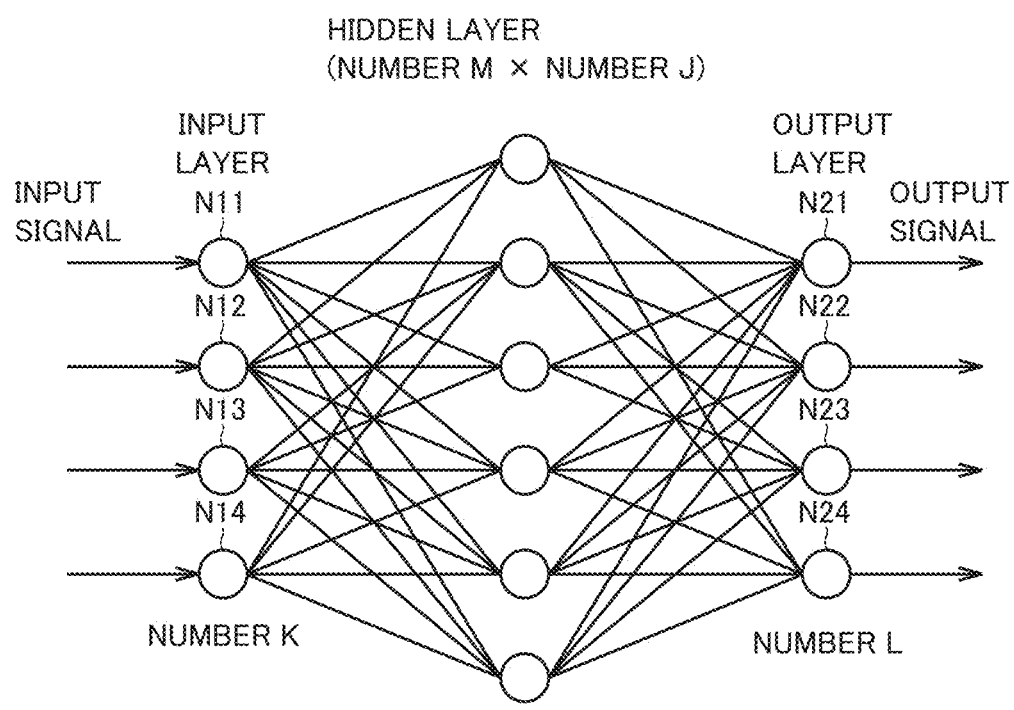
FIG. 11 is a conceptual diagram illustrating a neural network model for a power conversion system according to Embodiment 4.

FIG. 11 is a conceptual diagram illustrating a neural network model for a power conversion system according to Embodiment 4.

Referring to FIG. 11, a neural network model 210 is constructed in management apparatus 200.

Referring to FIG. 11, neural network model 210 includes number K (K is an integer not less than two) of neurons configuring an input layer, number L (L is a natural number) of neurons No configuring an output layer, and multiple neurons configuring a hidden layer connected between the input layer and the output layer. In the example of FIG. 11, where K=L=4, neurons N11 to N14 are arranged in the input layer, and four neurons N21 to N24 are arranged in the output layer.

The hidden layer is configured by interconnecting a maximum number J of neurons over number M of layers (M and J are integers not less than two). The above numbers of parameters K, L, M, J are determined, so that the structure of neural network model 210 is set. In this manner, the structure of neural network model 210 can be set appropriately depending on the numbers of input layers, hidden layers, and output layers, and the number of neurons of each layer.

An activating function is input to each neuron indicated by a circle in FIG. 11. For example, the activating function may be a sigmoid function and may be any other appropriate well-known activating function.

An input signal to the input layer includes a quantitative value indicating the state of the distribution system and a command value to each distributed power supply apparatus 100. The command value to distributed power supply apparatus 100 includes at least any of first voltage range VW1, second voltage range VW2, holding time Tm, and rate value $\Delta Qr$ in the rating process after the end of the holding time. It is to be noted that at least first voltage range VW1 and second voltage range VW2 are included in the input signal.

The state of the distribution system includes any of the date and time, weather, and season. An input signal indicating such a state can be used as an indicator indirectly indicating a difference in power load depending on a difference in the date and time, weather, and season, and a difference in an amount of electric power generated in each distributed power supply apparatus. Moreover, the input signal can be defined such that the direction and speed of movement of a cloud are included in the state of the distribution system.

On the other hand, an output signal from the output layer includes at least reactive power ratio Q in distributed power supply apparatus 100.

In management apparatus 200, a pair of an input signal and an output signal at a certain period of time is input to neural network model 210 as training data, with the use of a common neural network model 210. As a weighting coefficient between neurons is determined through machine learning using multiple pieces of training data obtained from the past actual result value, neural network model 210 is constructed.

The weighting coefficient is updated every time new training data is input. Alternatively, when a certain period of time elapses or when the number of updates reaches a predetermined number of times, relatively old training data may be discarded, and then, a weighting coefficient may be determined.

Machine learning for obtaining a weighting coefficient can be performed individually for multiple distributed power supply apparatuses 100 using the same neural network model 210. In other words, the weighting coefficient between neurons of neural network model 210 can be set to a separate value for every distributed power supply apparatuses 100. For example, even when multiple distributed power supply apparatuses 100 are arranged in the same smart town, considering that a timing at which sunlight changes varies by about several seconds and that the behavior of the interconnection point voltage differs depending on the position of distributed power supply apparatus 100, the weighting coefficient is preferably set to a separate value for every distributed power supply apparatuses 100.

Figure 12:
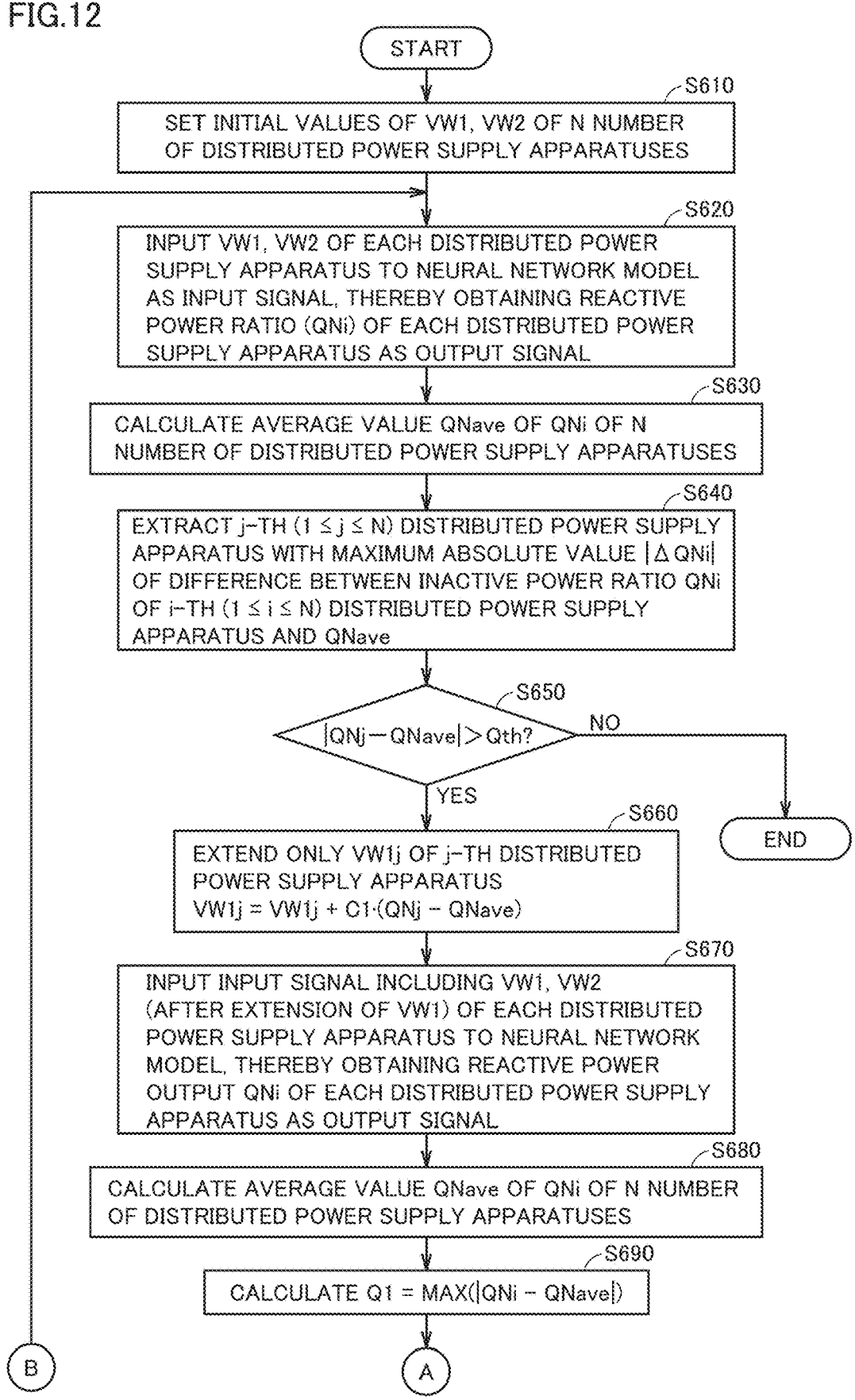
FIG. 12 is a first flowchart illustrating a control process of setting a command value of a distributed power supply apparatus using the neural network model in the power conversion system according to Embodiment 4.

A control process of setting a command value of a distributed power supply apparatus will be described using a neural network model in a power conversion system according to Embodiment 4, with reference to FIGS. 12 and 13. FIGS. 12 and 13 representatively illustrate a control process for setting first voltage range VW1 and second voltage range VW2 as command values of distributed power supply apparatuses 100. The control process shown in FIGS. 12 and 13 can be performed by management apparatus 200 every time a prescribed period of time (e.g., 30 minutes), which is a cycle of transmission of information to distributed power supply apparatus 100, elapses.

Referring to FIG. 12, management apparatus 200 sets initial values of first voltage range VW1 and second voltage range VW2 of N number of distributed power supply apparatuses 100 at S610. At S620, management apparatus 200 further supplies an input signal including first and second voltage ranges VW1, VW2 set at S610 to neural network model 210 to each distributed power supply apparatus 100, thereby obtaining a reactive power ratio QNi as the output signal.

At S630, management apparatus 200 calculates an average value QNave of reactive power ratios QNi of N number of distributed power supply apparatuses 100 calculated at S620. Management apparatus 200 further obtains $\Delta QNi=QNi-QNave$ of i-th (i is a natural number of 1 to n) distributed power supply apparatus 100 at S630, and extracts a j-th (j is a natural number of i to n) distributed power supply apparatus 100 with a maximum $|\Delta QNi|$ at S640.

Management apparatus 200 compares |QNj−QNave| in j-th distributed power supply apparatus 100 extracted at S640 with a predetermination value QNth. When |QNj−QNave|>QNth (when determination is YES at S650), management apparatus 200 moves the process to S660 to extract only a first voltage range VW1j of j-th distributed power supply apparatus 100 extracted at S640, in accordance with Equation (7) below using a predetermined coefficient CN1.

$$VW1j = VW1j + CN1 \cdot |QNj - QNave| \quad (7)$$

At S680, management apparatus 200 inputs an input signal including first voltage range VW1j extended at S670 to neural network model 210, thereby obtaining reactive power ratio QNi of each distributed power supply apparatus 100. At S680, management apparatus 200 subsequently calculates an average value QNave of N number of reactive power ratios QNi obtained at S670. At S690, management apparatus 200 further obtains a maximum value MAX (|QNi−QNave|) of |QNi−QNave| in N number of distributed power supply apparatuses 100.

At S700, management apparatus 200 further modifies first voltage range VW1j and second voltage range VW2j of j-th distributed power supply apparatus 100 extracted at S640, in accordance with Equations (8) and (9) below. CN2 of Equation (9) is a predetermined coefficient.

$$VW1j = VW1j - CN1 \cdot |Qj - Qave| \quad (8)$$

$$VW2j = VW2j + CN2 \cdot |Qj - Qave| \quad (9)$$

Through S700, first voltage range VW1$j$ is returned to a value before extension at S660, whereas second voltage range VW2$j$ is extended from its original value. In other words, at S700, contrary to the process at S660, a state in which only second voltage range VW2$j$ of j-th distributed power supply apparatus 100 is extended using coefficient CN2 is formed.

At S710, management apparatus 200 inputs an input signal including second voltage range VW2$j$ extended at S700 to neural network model 210, thereby obtaining reactive power ratio QNi of each distributed power supply apparatus 100 as an output signal. At S720, management apparatus 200 subsequently calculates average value QNave of N number of reactive power ratios QNi obtained at S710. At S720, management apparatus 200 further obtains a maximum value Q2=MAX(|QNi−QNave|) of |QNi−QNave| in N number of distributed power supply apparatuses 100.

At S740, management apparatus 200 compares maximum value Q1 calculated at S690 with Q2 calculated at S730. When Q1<Q2 (when determination is YES at S740), that is, when variations in reactive power ratio can be reduced more effectively when management apparatus 200 modifies only first voltage range VW1$j$ (S660), at S750, management apparatus 200 returns first voltage range VW1$j$ and second voltage range VW2$j$ to the same values as those before execution of S660 and subsequently returns the process to SS620. In other words, at S750, first voltage range VW1$j$ and second voltage range VW2$j$ are modified in accordance with Equations (10) and (11) below.

$$VW1j = VW1j + CN1 \cdot |Qj - Q_{ave}| \quad (10)$$

$$VW2j = VW2j - CN2 \cdot |Qj - Q_{ave}| \quad (11)$$

Contrastingly, when Q1≥Q2 (when determination is NO at S740), that is, when variations in reactive power ratio are reduced more effectively when management apparatus 200 modifies only second voltage range VW2$j$ (S700), at S750, management apparatus 200 returns the process to SS620 with first voltage range VW1$j$ and second voltage range VW2$j$ maintained at the values after the execution of S700.

After performing the processes of S620 to S640 again, at S650, management apparatus 200 compares the maximum value of the absolute value of ΔQNi=QNi−QNave among N number of distributed power supply apparatuses 100 with determination value QNth. When |QNj−QNave|>QNth (when determination is YES at S650), management apparatus 200 performs again the processes of S660 to S750 and S620 to S650 for extending first voltage range VW1 or second voltage range VW2.

The process of extending first voltage range VW1 and second voltage range VW2 is performed until |QNj−QNave|≤QNth is satisfied at S650, that is, until variations in reactive power ratio QN among multiple (N number of) distributed power supply apparatuses 100 falls below the determination value. When |QNj−QNave|≤QNth is satisfied (when determination is NO at S650), management apparatus 200 ends the process of setting the first and second voltage ranges using neural network model 210 (FIG. 11).

Management apparatus 200 further transmits first voltage range VW1$i$ and second voltage range VW2$i$ at the time of the end of the setting process to a corresponding one of N number of distributed power supply apparatuses 100 at the following communication timing.

Although a maximum value is obtained as an example of the indicator for evaluating the magnitude of variations in reactive power ratio QN among multiple (N number of) distributed power supply apparatuses 100 at S650, a difference between maximum value and minimum value, a standard deviation, or the like can be obtained in place of the maximum value to evaluate the magnitude of variations.

As described above, the power conversion system according to Embodiment 4 can adjust first and second voltage ranges VW1, VW2 of distributed power supply apparatuses 100 with the use of the neural network subjected to machine learning using an actual result value in reactive power control performed in distributed power supply apparatuses 100. This can reduce uneven sharing of reactive power for the stabilization of a system voltage among distributed power supply apparatuses 100, leading to even sharing.

It is to be noted that first and second voltage ranges VW1, VW2 among command values of distributed power supply apparatus 100 are adjusted using neural network model 210 in FIGS. 12 and 13, but any other appropriate command value, which is included in the input signal of neural network model 210 (FIG. 11), can be adjusted similarly.

It is to be understood that the embodiments disclosed herein are presented for the purpose of illustration and non-restrictive in every respect. It is therefore intended that the scope of the present invention is defined by claims, not only by the embodiments described above, and encompasses all modifications and variations equivalent in meaning and scope to the claims.

REFERENCE SIGNS LIST 50 power conversion system; 100 distributed power supply apparatus; 110 distributed power supply; 120 power conditioner; 121 voltage control unit; 121$a$ voltage command value generation unit; 121$b$ subtraction unit; 121$c$ reactive power command value generation unit; 122 reactive power control unit; 123 active power control unit; 124 current control unit; 125 control operation unit; 130 power conversion circuit; 131 DC/DC converter; 132 DC/AC inverter; 135 voltage detector (interconnection point voltage); 200 management apparatus; 205 communication unit; 210 neural network model; 300 distribution system; 301 interconnection point; 310 step voltage regulator; 500 substation; Ipref active current command value (instantaneous value); Iqref reactive current command value (instantaneous value); Iref current command value (instantaneous value); N11-N14, N21-N24 neuron; Pref active power command value (effective value); Qref reactive power command value (effective value); Tm holding time; Tmax maximum time (holding time); Tx elapsed time; VW1 first voltage range; VW2 second voltage range; Vip interconnection point voltage; Vref voltage command value (interconnection point voltage).

The invention claimed is:

1. A power conversion system comprising:
one or more distributed power supply apparatuses interconnected to a distribution system; and
a management apparatus for the one or more distributed power supply apparatuses,
the management apparatus periodically transmitting, to the one or more distributed power supply apparatuses, information for setting a first voltage range used in control of the one or more distributed power supply apparatuses and a second voltage range smaller than the first voltage range,
the distributed power supply apparatus including
a distributed power supply, a power conversion circuit to control power conversion between an interconnection point with the distribution system and the distributed power supply, a control operation circuit to control the power conversion circuit, and a voltage detector to detect a voltage of the interconnection point, wherein the control operation circuit removes, from an interconnection point voltage detected by the voltage detector, a voltage fluctuation component with a cycle shorter than a cycle in which the information is transmitted from the management apparatus, to thereby generate a voltage command value of the interconnection point, and performs reactive power control of causing the power conversion circuit to generate reactive power for eliminating a voltage deviation of the interconnection point voltage with respect to the voltage command value, and in the reactive power control, the generation of the reactive power is started when an absolute value of the voltage deviation exceeds the first voltage range, and the reactive power is adjusted so as to decrease the absolute value of the voltage deviation until the absolute value of the voltage deviation falls below the second voltage range.

2. The power conversion system according to claim 1, wherein the control operation circuit provides a holding period in which the generation of the reactive power at a point of time when the absolute value of the voltage deviation falls below the second voltage range due to the generation of the reactive power is held, and after the holding period ends, performs a rating process of gradually moving an absolute value of the reactive power toward zero.

3. The power conversion system according to claim 2, wherein the control operation circuit adjusts the reactive power again so as to decrease the absolute value of the voltage deviation when the absolute value of the voltage deviation exceeds the first voltage range during the holding period.

4. The power conversion system according to claim 1, wherein the control operation circuit performs a rating process of gradually moving an absolute value of the reactive power toward zero after the absolute value of the voltage deviation falls below the second voltage range.

5. The power conversion system according to claim 1, wherein
the distributed power supply apparatuses are interconnected to the distribution system,
the first and second voltage ranges are separately set in the distributed power supply apparatuses, and
the management apparatus updates the information for updating the first and second voltage ranges so as to balance sharing of the generation of the reactive power among the distributed power supply apparatuses based on an actual result value of the reactive power control in the distributed power supply apparatuses, and periodically transmits the information to the distributed power supply apparatuses.

6. The power conversion system according to claim 2, wherein
the distributed power supply apparatuses are interconnected to the distribution system,
in the distributed power supply apparatuses, the first and second voltage ranges are separately set, and a length of the holding period is set in common, and
the management apparatus periodically transmits, to each of the distributed power supply apparatuses, information for changing the length of the holding period based on an actual result of the reactive power control in the distributed power supply apparatuses.

7. The power conversion system according to claim 6, further comprising a step voltage regulator connected to the distribution system,
wherein the length of the holding period is variably set within a range not greater than a maximum time set variably based on an actual operation result of the step voltage regulator.

8. The power conversion system according to claim 2, wherein
the distributed power supply apparatuses are interconnected to the distribution system,
in the distributed power supply apparatuses, the first and second voltage ranges are separately set, and an amount of change in an absolute value of the reactive power per unit time in the rating process is set in common, and
the management apparatus periodically transmits, to each of the distributed power supply apparatuses, information for changing the amount of change based on an actual result of the reactive power control in the distributed power supply apparatuses.

9. The power conversion system according to claim 1, wherein
the distributed power supply apparatuses are interconnected to the distribution system,
the first and second voltage ranges are separately set in the distributed power supply apparatuses,
the management apparatus includes a neural network model for machine learning of input and output characteristics of the distributed power supply apparatus,
an input signal of the neural network model includes data indicating a state of the distributed power supply apparatus and a command value of the distributed power supply apparatus including the first and second voltage ranges,
an output signal of the neural network model includes a reactive power ratio that is a ratio of an actual result value of the generated reactive power to rated apparent power of the power conversion circuit in the distributed power supply apparatus,
the management apparatus calculates a weighting factor of a plurality of neurons configuring the neural network model every time the input signal and the output signal are obtained based on the actual result value of the reactive power control in the distributed power supply apparatuses, and
the management apparatus updates the command value so as to balance sharing of the generation of the reactive power among the distributed power supply apparatuses using the neural network model, and periodically transmits information about the command value to the distributed power supply apparatuses.

10. A management apparatus for a power conversion system in which a distributed power supply apparatus is interconnected to a distribution system,
the management apparatus comprising a communication unit to periodically transmit, to the distributed power supply apparatus, information for setting a first voltage range used in control of the distributed power supply apparatus and a second voltage range smaller than the first voltage range, wherein
the distributed power supply apparatus removes, from an interconnection point voltage at an interconnection point with the distribution system, a voltage fluctuation component with a cycle shorter than a cycle in which the information is transmitted from the communication unit, to thereby generate a voltage command value of the interconnection point, and performs reactive power control of generating reactive power for eliminating a voltage deviation of the interconnection point voltage with respect to the voltage command value, and in the reactive power control, the generation of the reactive power is started when an absolute value of the voltage deviation exceeds the first voltage range, and the reactive power is adjusted so as to decrease the absolute value of the voltage deviation until the absolute value of the voltage deviation falls below the second voltage range.

11. The management apparatus for a power conversion system according to claim 10, wherein in the reactive power control, a rating process of gradually moving an absolute value of the reactive power toward zero after the absolute value of the voltage deviation falls below the second voltage range is performed.

12. A distributed power supply apparatus interconnected to a distribution system, the distributed power supply apparatus comprising:

a distributed power supply;

a power conversion circuit to control power conversion between an interconnection point with the distribution system and the distributed power supply, a control operation circuit to control the power conversion circuit, and a voltage detector to detect a voltage of the interconnection point, the distributed power supply apparatus periodically receiving, from a management apparatus external to the distributed power supply apparatus, information for setting a first voltage range and a second voltage range smaller than the first voltage range, wherein the control operation circuit removes, from an interconnection point voltage detected by the voltage detector, a voltage fluctuation component with a cycle shorter than a cycle in which the information is transmitted, to thereby generate a voltage command value of the interconnection point, and performs reactive power control of causing the power conversion circuit to generate reactive power for eliminating a voltage deviation of the interconnection point voltage with respect to the voltage command value, and in the reactive power control, the generation of the reactive power is started when an absolute value of the voltage deviation exceeds the first voltage range, and the reactive power is adjusted so as to decrease the absolute value of the voltage deviation until the absolute value of the voltage deviation falls below the second voltage range.

13. The distributed power supply apparatus according to claim 12, wherein in the reactive power control, a rating process of gradually moving an absolute value of the reactive power toward zero after the absolute value of the voltage deviation falls below the second voltage range is performed.

* * * * *